United States Patent [19]
Ogino et al.

[11] Patent Number: 5,363,208
[45] Date of Patent: Nov. 8, 1994

[54] IMAGE FORMING APPARATUS COMPRISING INTEGRATING MEANS FOR INTEGRATING IMAGE DENSITY DATA

[75] Inventors: Shigeo Ogino, Toyokawa; Masaaki Nishiyama, Toyohashi, both of Japan

[73] Assignee: Minolta Camera Kabushiki Kaisha, Osaka, Japan

[21] Appl. No.: 606,075

[22] Filed: Oct. 30, 1990

[30] Foreign Application Priority Data

| Nov. 1, 1989 | [JP] | Japan | 1-285339 |
| Nov. 1, 1989 | [JP] | Japan | 1-285340 |
| Nov. 1, 1989 | [JP] | Japan | 1-285341 |
| Nov. 1, 1989 | [JP] | Japan | 1-285342 |
| Nov. 1, 1989 | [JP] | Japan | 1-285343 |
| Nov. 1, 1989 | [JP] | Japan | 1-285344 |

[51] Int. Cl.5 .................................. H04N 1/29
[52] U.S. Cl. ............................ 358/445; 358/401; 358/298
[58] Field of Search .......... 358/445, 446, 459, 462, 358/454, 77, 751 J, 401, , 501, 502, 534, 536, 296, 298, 302, 300; 346/160, 159; H04N 1/29

[56] References Cited

U.S. PATENT DOCUMENTS

| 3,564,130 | 2/1971 | Crooks et al. | 358/459 |
| 3,662,092 | 5/1972 | Morton | 358/446 |
| 3,965,290 | 6/1976 | Tisue | 358/454 |
| 4,763,199 | 8/1988 | Suzuki | 358/445 |
| 4,782,398 | 11/1988 | Mita | 358/445 |
| 4,800,442 | 1/1989 | Riseman et al. | 358/459 |
| 4,897,734 | 1/1990 | Sato et al. | 358/448 |
| 4,999,718 | 3/1991 | Arai | 358/455 |

FOREIGN PATENT DOCUMENTS

| 0213891 | 11/1987 | European Pat. Off. |
| 61-173576 | 8/1986 | Japan |
| 62-101175 | 5/1987 | Japan |
| 63-58584 | 3/1988 | Japan |

OTHER PUBLICATIONS

"Video Pick-Off Circuit" Pruett et al. IBM Tech Discl. Bull vol. 24 No. 5 Oct. 1981, p. 2231.

Primary Examiner—Reinhard J. Eisenzopf
Assistant Examiner—Jill Jackson
Attorney, Agent, or Firm—Burns, Doane, Swecker & Mathis

[57] ABSTRACT

There is disclosed an image forming apparatus for generating a printing signal having a pulse width according to image density data corresponding to an image to be formed and forming dot images on a paper, each dot image having a size corresponding to the pulse width. An integrating circuit integrates the image density data for a predetermined integration period and outputting integrated image density data, and a comparator compares the integrated image density data with a predetermined threshold data and generating a printing signal having a pulse width corresponding to the comparison result thereof.

28 Claims, 21 Drawing Sheets

Fig. 26a
L1 → ○
L2 → ○
L3 → ○
Fig. 26b
L1 → ◯
L2 → ○
L3 → ◯
Fig. 26c
L1 → ◯
L2 → ◯
L3 → ◯
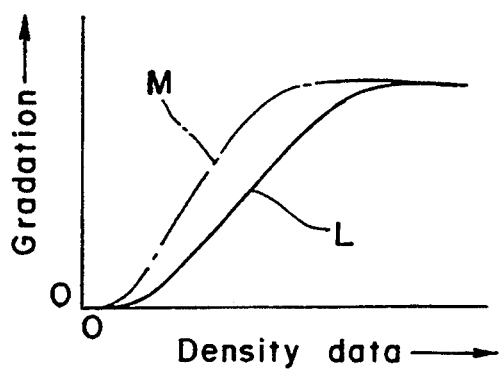
Fig. 27
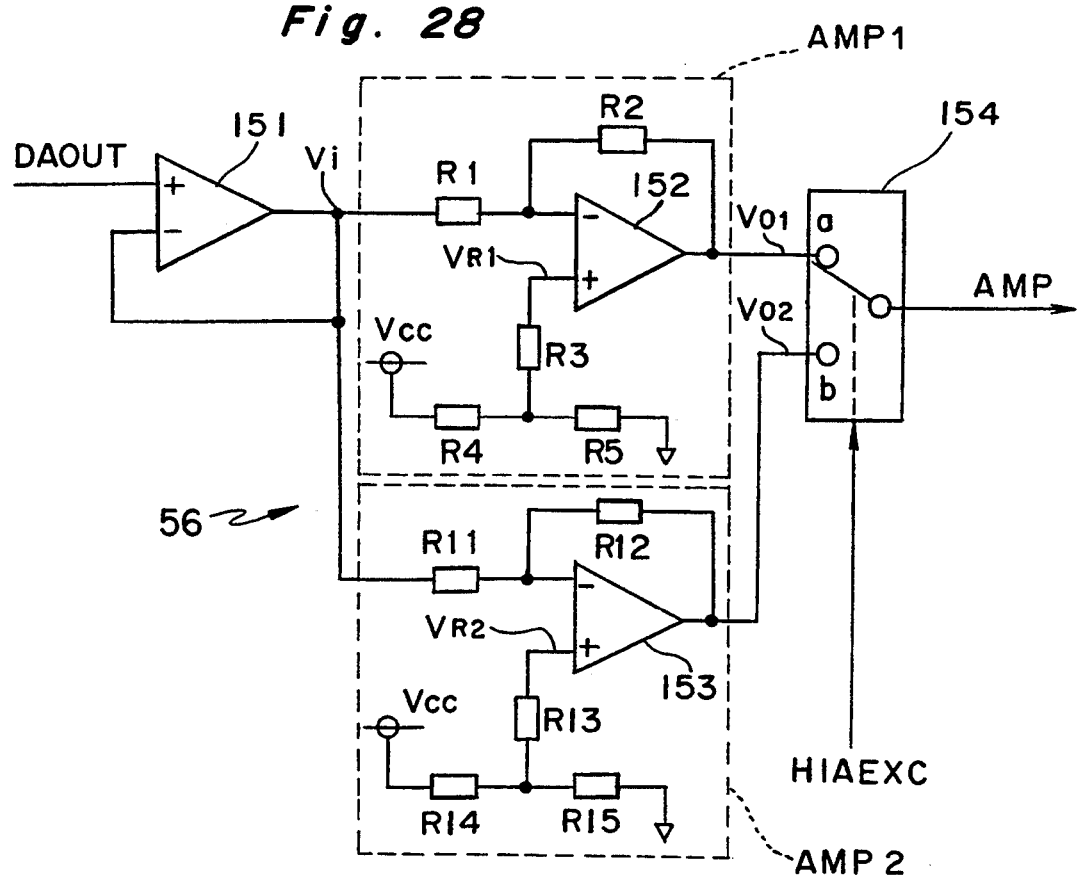
Fig. 28

IMAGE FORMING APPARATUS COMPRISING INTEGRATING MEANS FOR INTEGRATING IMAGE DENSITY DATA

BACKGROUND OF THE INVENTION

1. Field of the Invention

The present invention relates to an image forming apparatus, and more particularly, to an image forming apparatus such as a laser printer using the electrophotographic process, comprising comparing means for comparing a threshold signal with image density data (referred to as density data hereinafter) corresponding to an image to be formed.

2. Description of the Related Art

Conventionally, when a half tone image is printed on a piece of paper by a printer, density data of respective pixels are sent from an image reader to a printer controller, wherein each density data represents a gradation of each pixel. The printer controller generates a printing signal for controlling the printer to print each dot utilizing the dither method according to the received density data and outputs the printing signal to the printer. In the printer of this type, the sizes of respective dots are set at substantially the same.

Recently, the pulse modulation method has been used for half tone representation. In this method, the density of one dot is represented by a gradation signal of, for example, 8 bits, and the pulse width of the printing signal is modulated according to the density data so as to change a dimension of each dot to be printed in order to reproduce a half tone image having 256 gradation steps. In this case, the half tone image can be printed without deterioration of the resolution of the printed image. For example, in the laser printer, a semiconductor laser diode emits a beam of light for a period of the pulse width so as to form each dot having a size corresponding to the pulse width.

In order to generate the printing signal using the pulse width modulation method, for example, there has been used a method of comparing the density data with a predetermined pattern signal having a constant period and a constant amplitude such as a sawtooth wave signal. In a method using the sawtooth wave signal as a threshold signal, the sawtooth wave signal having a constant amplitude and a constant period is inputted to an inverted input terminal of a comparator. The period of the sawtooth wave signal is set so as to correspond to the output period of the density data. A gradation signal of, for example, 8 bits which has been received from the host computer such as an image reader is converted into an analogue voltage for one period of the sawtooth wave signal, and the converted analogue voltage is inputted as density data to a non-inverted input terminal of the comparator. In this case, a pulse signal for printing a dot is generated for a period when the density data are larger than the level of the sawtooth wave signal for one period thereof. This pulse signal is outputted to the printer for a period which is in proportion to the density data, and then, a dimension of each dot is modulated according to the pulse width of the pulse signal.

Further, in the triangular wave method which is a modification of the aforementioned sawtooth wave method, a triangular wave signal having a constant period and a constant amplitude is used instead of the sawtooth wave signal in order to improve the gradation characteristic. In this case, one pulse signal is generated for a period of two dots.

The composition of the printer controller using the aforementioned sawtooth wave signal is simple. However, for example, when a pulse signal is generated with a period of non-integer times one dot, there is such a problem that it is necessary to alter the output period of the sawtooth wave signal.

SUMMARY OF THE INVENTION

An essential object of the present invention is to provide an image forming apparatus utilizing a density integration method for integrating density data which is a new pulse width modulation method.

Another object of the present invention is to provide an image forming apparatus utilizing a pulse width modulation method, capable of printing a half tone image with a faithful gradation representation.

A further object of the present invention is to provide an image forming apparatus utilizing a pulse width modulation method, capable of printing a half tone image in a high speed with a faithful gradation representation.

A still further object of the present invention is to provide an image forming apparatus utilizing a pulse width modulation method, capable of generating a printing signal having a pulse width faithfully corresponding to density data.

A still more further object of the present invention is to provide an image forming apparatus utilizing a pulse width modulation method, capable of printing a half tone image with a better gradation characteristic in a low density.

In order to accomplish the above objects, according to one aspect of the present invention, there is provided an image forming apparatus for generating a printing signal having a pulse width according to image density data corresponding to an image to be formed and forming dot images on a paper each dot image having a size corresponding to said pulse width, comprising:

integrating means for integrating said image density data for a predetermined integration period and outputting integrated image density data; and comparing means for comparing said integrated image density data with a predetermined threshold data and generating a printing signal having a pulse width corresponding to said comparison result thereof.

According to another aspect of the present invention, in the above-mentioned image forming apparatus, said apparatus further comprises timing signal generating means for generating a timing signal provided for integrating said image density data so that said predetermined integration period of said integrating means is different from a period corresponding to a unit of said image density data.

According to a further aspect of the present invention, in the above-mentioned image forming apparatus, said apparatus further comprises selection means for selecting either one of plural different integration periods of said integrating means, wherein said timing signal generating means generates said timing signal responsive to said integration period selected by said selection means.

According to a still further aspect of the present invention, in the above-mentioned image forming apparatus, said apparatus further comprises gain switching means for amplifying said image density data with different gains on alternate lines in a subscan direction which is perpendicular to a main scan direction in which said dot images are printed on a paper continuously so that printed dot images are not overlapped in said subscan direction and outputting said amplified image density data to said integrating means.

According to a still more further aspect of the present invention, in the above-mentioned image forming apparatus, said apparatus further comprises correction means for correcting said image density data in a predetermined correction manner and outputting said corrected image density data to said gain switching means.

According to still another aspect of the present invention, in the above-mentioned image forming apparatus, said integrating means including plural integrating circuits, and said comparing means including plural comparators, and said apparatus further comprising control means for controlling said plural integrating circuits and said comparators so as to enable them alternately to sequentially generate said printing signal.

According to still more another aspect of the present invention, in the above-mentioned image forming apparatus, said apparatus further comprises gain switching means for amplifying said image density data with different gains on alternate lines in a subscan direction which is perpendicular to a main scan direction in which said dot images are printed on a paper continuously so that printed dot images are not overlapped in said subscan direction and outputting said amplified image density data to said integrating means.

According to still further another aspect of the present invention, in the above-mentioned image forming apparatus, said apparatus further comprises further control means for controlling said comparing means so as not to output said printing signal for a period other than said integration period.

According to still more further another aspect of the present invention, in the above-mentioned image forming apparatus, said apparatus further comprises adder means for adding image density data corresponding to each dot image every dot image to be printed and outputting said added image density data to said integrating means.

According to still furthermore another aspect of the present invention, in the above-mentioned image forming apparatus, said apparatus further comprises conversion means for complementarily converting image density data inputted from said external unit into smaller image density data when said inputted image density data are larger and into larger image density data when said inputted image density data are smaller and outputting said converted image density data to said integrating means.

BRIEF DESCRIPTION OF THE DRAWINGS

These and other objects and features of the present invention will become clear from the following description taken in conjunction with the preferred embodiment thereof with reference to the accompanying drawings, in which:

FIG. 2a is a timing chart of waveforms of an integral voltage INTG, a timing signal INTGT and a laser diode ON signal LDON showing an operation of the light emitting controller shown in FIG. 1a;

FIGS. 26a to 26c are front views showing examples of three dots printed on three lines;

FIG. 27 is a graph showing relationship between the gradation and the density data;

FIG. 28 is a schematic block diagram showing a composition of a gain switching section shown in FIG. 17;

DETAILED DESCRIPTION OF THE PREFERRED EMBODIMENTS

A laser printer of a preferred embodiment according to the present invention will be described below in an order of the following paragraphs with reference to the attached drawings.

(a) Control of light emitting time using Density data integrating method
  (a-1) Composition of Light emitting controller of Laser printer using Density data integrating method
  (a-2) Integration and correction of Density data
  (a-3) High speed density data integrating method utilizing two systems
  (a-4) Switching of integration time and Addition of Density data
  (a-5) Stabilization of gradation in low density or high density
(b) Composition of Light emitting controller of Laser printer
(c) Composition of high speed two systems type light emitting controller of laser printer
(d) Addition of density data of plural pixels
(e) Correction of Density data
(f) Switching of gain in subscan direction
(g) Integrating circuit and Comparator section
(h) Modification

(a) Control of Light Emitting Time Using Density Data Integrating Method

(a-1) Composition of Light Emitting Controller

In the laser printer of the present preferred embodiment, an image of image data sent from an image reader is printed on a piece of paper in the electrophotographic process as follows. Namely, a semiconductor laser diode emits a beam of laser light according to density data (a gradation signal) sent from an image reader so as to form an electrostatic latent image on a photoconductive drum, and the electrostatic latent image is developed with toner so as to form a toner image thereon by a developing unit. Thereafter, the toner image is transferred onto a piece of paper, and is fixed thereon. In this laser printer, the emitting time of the semiconductor laser diode is changed every one dot according to density data. In the present preferred embodiment, the light emitting time is controlled using a density data integrating method which is described in detail below.

Figure 1A:
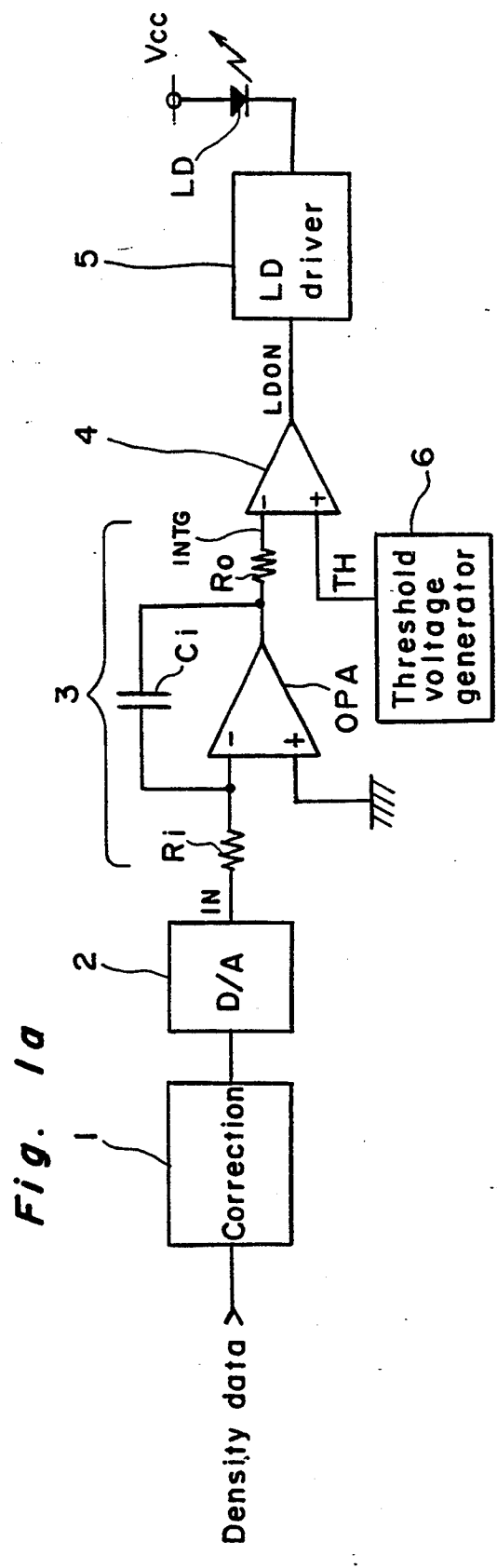
FIG. 1a is a schematic block diagram showing a composition of a light emitting controller of a laser printer of a preferred embodiment according to the present invention, using a pulse width modulation method and a density data integration method.

FIG. 1a is a schematic block diagram of a laser printer for controlling emission of the semiconductor laser diode.

Referring to FIG. 1, density data of 8 bits are received from a host computer such as an image reader. Thereafter, the density data are corrected by a correction section 1 in a predetermined correction process described in detail later so as to output corrected density data. A digital/analogue converter (referred to as a D/A converter hereinafter) 2 converts the corrected density data into an analogue voltage signal IN, and then, an integrating circuit 3 comprising an operational amplifier OPA, an input resistor Ri, a feed back capacitor Ci and an output resistor Ro integrates the analogue voltage signal IN for a predetermined integration period so as to output an integral voltage INTG. The integral voltage INTG is compared with a predetermined threshold voltage TH outputted from a threshold voltage generator 6 by a comparator 4 comprising an inverted input terminal connected to the output resistor Ro and a non-inverted input terminal connected to the threshold voltage generator 6. Then, when the integral voltage INTG is equal to or larger than the threshold voltage TH, the comparator 4 outputs a laser diode ON signal LDON having a high level to the semiconductor laser diode LD through a laser diode driver 5. On the other hand, when the integral voltage INTG is smaller than the threshold voltage TH, the comparator 4 outputs the laser diode ON signal LDON having a low level thereto. It is to be noted that the laser diode ON signal includes information of the light emitting time of the semiconductor laser diode LD.

In the laser printer of the present preferred embodiment, the semiconductor laser diode LD emits a beam of laser light for a time period while the laser diode ON signal is high level. Namely, the pulse width of the laser diode ON signal is modulated according to the density data so that a printing area of one dot is changed according to the density data.

In order to simplify the description of the light emitting controller of the laser printer, there is described hereinafter a light emitting controller shown in FIG. 1b wherein the density data sent from the image reader is directly inputted to the integrating circuit 3 through the A/D converter 2.

Figure 1B:
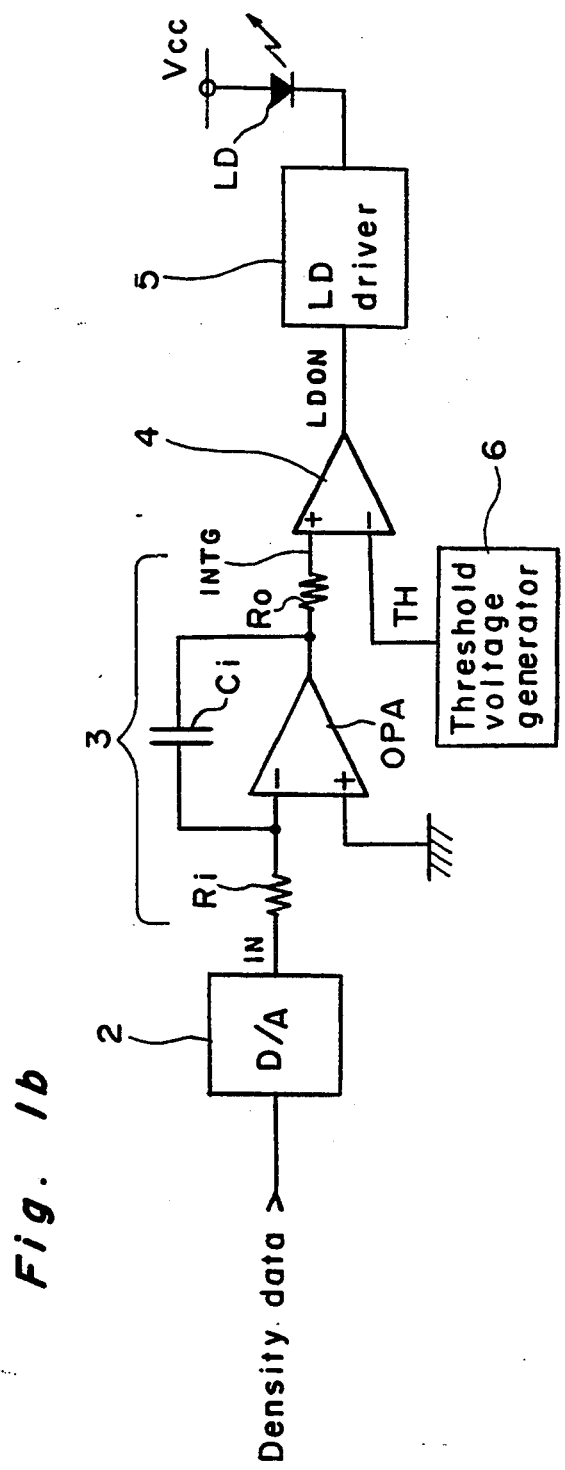
FIG. 1b is a schematic block diagram showing a composition of a light emitting controller of a laser printer of a modification of the preferred embodiment according to the present invention, using a pulse width modulation method and a density data integration method.
Figure 2A:
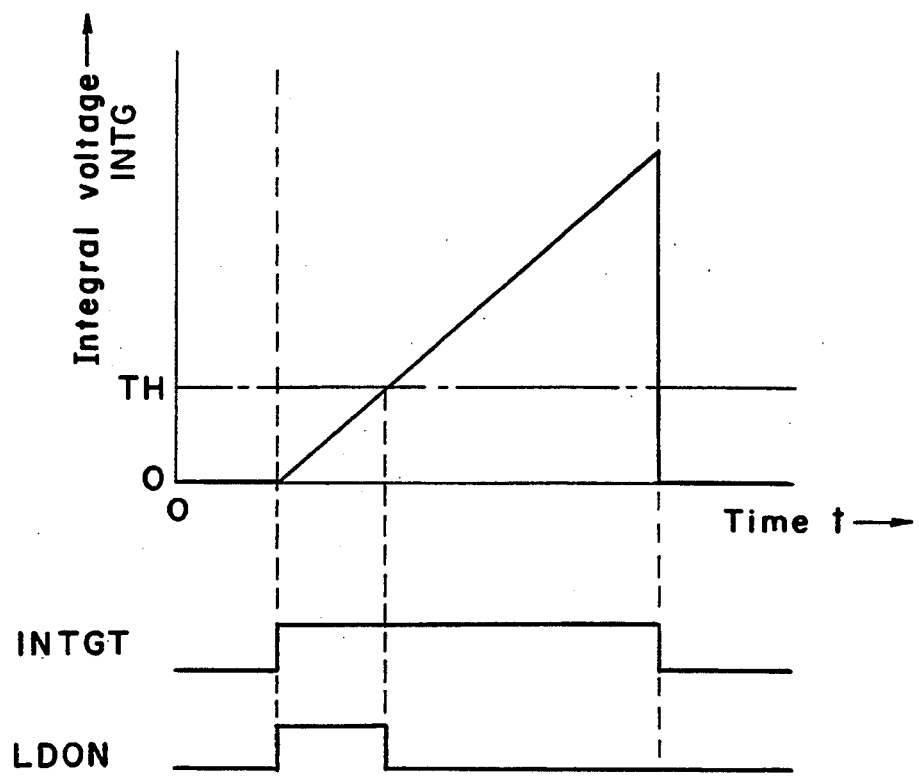
Figure 2B:
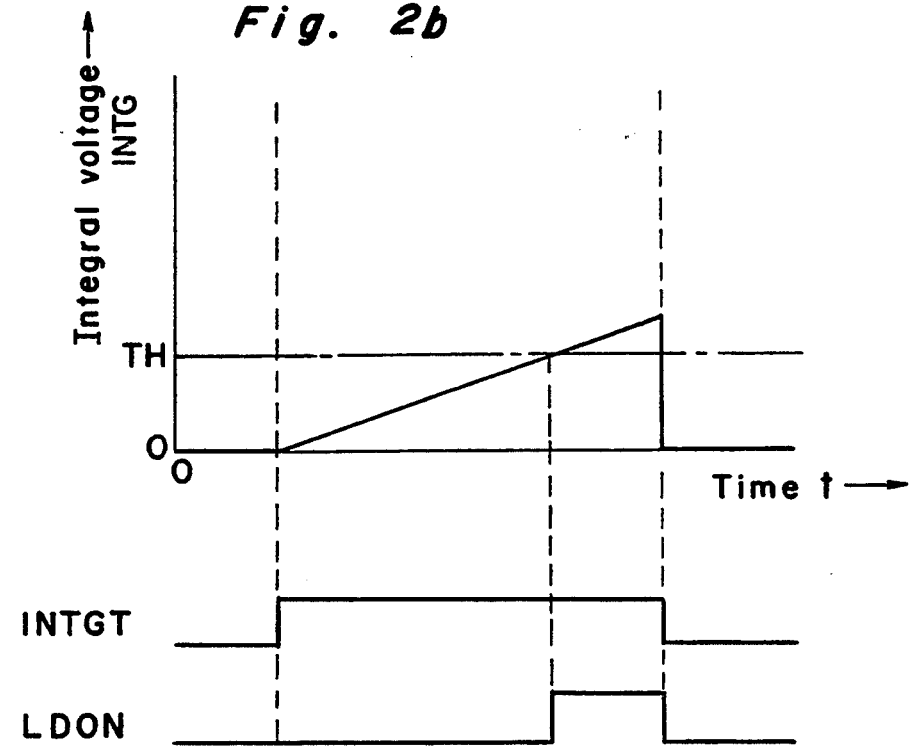
FIG. 2b is a timing chart of waveforms of the integral voltage INTG, the timing signal INTGT and the laser diode ON signal LDON showing an operation of the light emitting controller shown in FIG. 1b.

FIG. 2b shows an example of a waveform of the integral voltage INTG in the light emitting controller shown in FIG. 1b.

As is apparent from FIG. 2b, the integrating circuit 3 is reset prior to start of the integration. Since the input voltage IN is kept constant for the integration period or while a timing signal INTGT for representing the integration period is the high level, the integral voltage INTG increases in direct proportion to the elapsed time. The integral voltage INTG is compared with the threshold voltage TH by the comparator 4. In this case, the non-inverted input terminal of the comparator 4 is connected to the output resistor Ro of the integrating circuit 3, and the inverted input terminal thereof is connected to the threshold voltage generator 6. Therefore, the integral voltage INTG outputted from the integrating circuit 3 is inputted to the non-inverted input terminal of the comparator 4. When the integral voltage INTG becomes the threshold voltage TH, the comparator 4 turns on the laser diode ON signal LDON. The laser diode ON signal LDON having the high level is continuously outputted for a time period while the integral voltage INTG is equal to or larger than the threshold voltage TH, or until to the end of the integration period. Therefore, the semiconductor laser diode LD emits a beam of laser light for a time period corresponding to the density data within the above-mentioned integration period. Thus, the pulse width of the laser diode ON signal LDON for representing the light emitting period is modulated according to the density data. It is to be noted that the integrating circuit 3 is reset after the integration period.

The voltage IN actually inputted to the integrating circuit 3 is not the density data, and is a voltage which has been corrected by the correction section 1 shown in FIG. 1a in a predetermined manner as described in detail later in the paragraph (a-2).

When the gradation in a low density is regarded as important, the gradient of the integral voltage INTG in a low density is preferably set at a larger value. Due to this, in the present preferred embodiment, the complement of the density data received from the host computer is calculated by the correction section 1, and the voltage of the calculated complement is inputted to the integrating circuit 3 as the input voltage IN. Therefore, when the density data is small, the input voltage IN becomes large. On the other hand, when the density data is larger, the input voltage IN becomes small. An example of a waveform of the integral voltage INTG is shown in FIG. 2a in this case. The integrating circuit 3 is reset prior to start of the integration. In this case, the comparator 4 is connected to the integrating circuit 3 and the threshold voltage generator 6 as shown in FIG. 1a. The comparator 4 turns on the laser diode ON signal LDON at the same time the integration is started. On the other hand, since the input voltage IN is kept constant for the integration period, the integration voltage INTG increases in direct proportion to the elapsed time. The integral voltage INTG is compared with the threshold voltage TH by the comparator 4. When the integral voltage INTG becomes the threshold voltage TH, the comparator 4 stops generating the laser diode ON signal LDON so that the laser diode ON signal becomes the low level. As the density is lower, the gradient of the integral voltage INTG becomes larger and the pulse width becomes shorter. Thereafter, since the integral voltage INTG increases until the end of the integration period, the laser diode ON signal having the high level is not generated. Therefore, the pulse width of the laser diode ON signal LDON is modulated according to the density data in a manner similar to that shown in FIG. 1b. Even in this case, the voltage IN actually inputted to the integrating circuit 3 is a voltage which has been corrected by the correction section 1 in the aforementioned predetermined manner.

In the present preferred embodiment, analogue circuits are used as the integrating circuit 3 and the comparator 4, however, the present invention is not limited to this. Digital circuits may be used as the integrating circuit 3 and the comparator 4.

(a-2) Integration and Correction of Density Data

Figure 3:
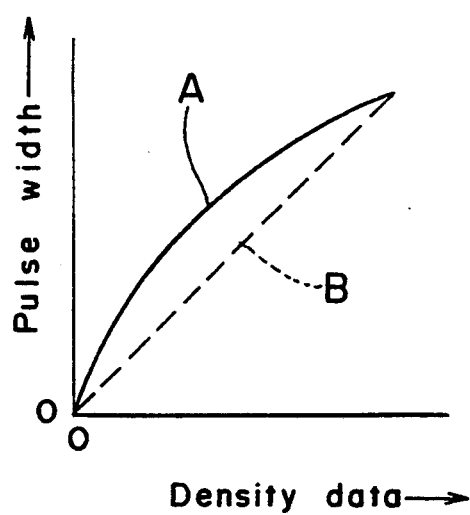
FIG. 3 is a graph showing a relationship between a pulse width and density data.

The pulse width corresponding to the light emitting time of the semiconductor laser diode LD or the gradation of an image printed by the light emission of the laser diode LD is preferably in proportion to the density data as shown in a straight line B of FIG. 3. However, generally, in the case that the received density data are not corrected by the correction section 1, when the density data or the complement thereof is inputted to the integrating circuit 3, the pulse width varies non-linearly on the density data with a convex raised upward as shown in a curve A because of the following reasons. In the density data integrating method, the integral voltage INTG is compared with the predetermined threshold voltage TH so as to generate the laser diode On signal LDON; however, the gradient of the integral voltage INTG is in proportion to the inputted voltage IN but the threshold voltage TH is kept constant. Therefore, the pulse width is not in proportion to the inputted density data. Accordingly, the correction section 1 corrects the density data so that the pulse width varies in direct proportion to the density data as shown in a curve C of FIG. 4. It is to be noted that the curve A of FIG. 3 reaches the straight line B of FIG. 3 if the threshold voltage TH reaches zero.

Practically, it is necessary to correct a γ characteristic of the laser printer. Namely, in laser printers utilizing the electrophotographic process, an image density of an image to be produced is not in direct proportion to an image density of an image produced on a piece of paper because of a combination of the photoconductive characteristic of the photoconductive drum, the characteristic of the toner used in the developing unit and the environment, and then, there is obtained a characteristic of the gradation of the printed image on the density data (referred to as a γ characteristic generally) which is shifted from a linear characteristic wherein an image density of an image to be produced is in direct proportion to an image density of an image produced on a piece of paper. Particularly, the γ characteristic causes lowering the faithfulness of the reproduced image upon printing a half tone image.

In the present preferred embodiment, the correction section 1 performs a γ-correction for correcting the γ characteristic, simultaneously. In the γ characteristic of the laser printer, a gradation of an image printed on a piece of paper by the laser printer varies non-linearly on the density data as shown in a curve D of FIG. 5, however, the γ characteristic is preferably corrected so that the gradation varies substantially linearly on the gradation density data as shown in a curve E of FIG. 5. In order to correct the γ characteristic so that the gradation varies substantially linearly on the density data, the correction section 1 corrects the density data so that the γ characteristic becomes a curve F of FIG. 6.

Figure 4:
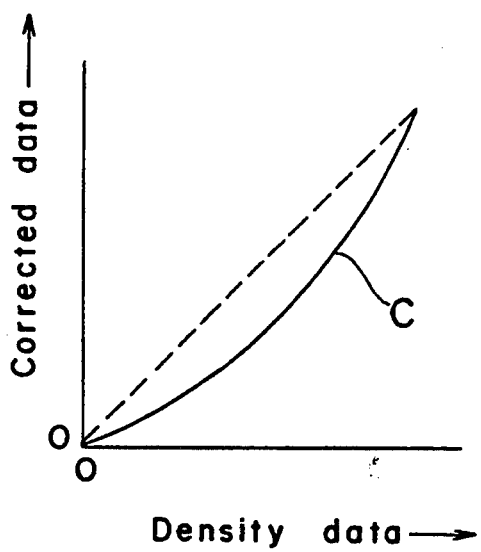
FIG. 4 is a graph showing a relationship between corrected data and density data.
Figure 6:
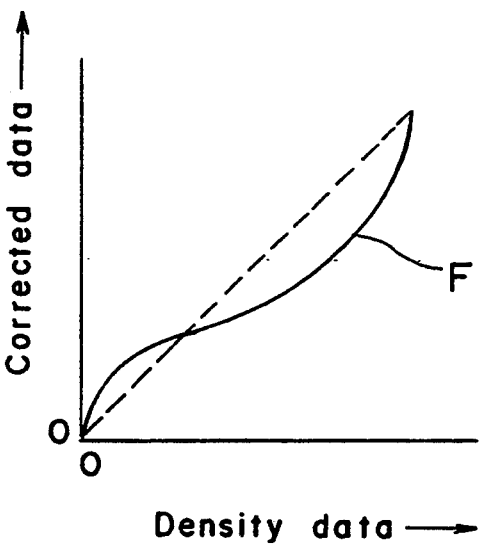
FIG. 6 is a graph of correction data for the $\gamma$ characteristic showing a relationship between the corrected data and density data.
Figure 7:
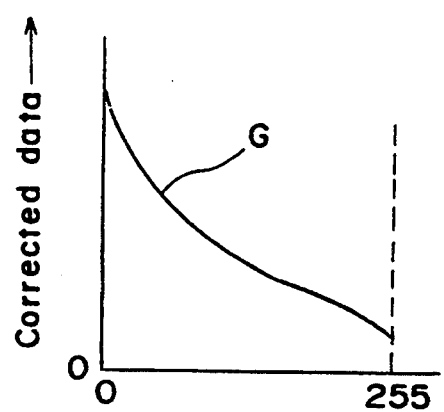
FIG. 7 is a schematic graph of a practical correction data showing a relationship between the corrected data and density data.

Therefore, in order to perform both the correction shown in the curve C of FIG. 4 and the correction shown in the curve F of FIG. 6, the correction section 1 corrects the density data so that the y characteristic becomes a curve G of FIG. 7 corresponding to a combination of the curve C of FIG. 4 and the curve F of FIG. 6.

In the present preferred embodiment, in order to regard stabilization of the gradation in a low density as important (See the paragraph (a-5)), the data which are obtained by correcting the complement of the density data in the aforementioned process are used as the input voltage IN to be inputted to the integrating circuit 3. Therefore, the correction section 1 corrects the density data so that the input voltage IN in a low density becomes larger than that in a high density. It is noted that an influence received from the threshold voltage TH inputted to a comparator 60 which is described in detail later is taken into consideration in this correction. The above correction is performed using a correction table stored in a ROM included in the correction section 1 (See the paragraph (e)).

Figure 8:
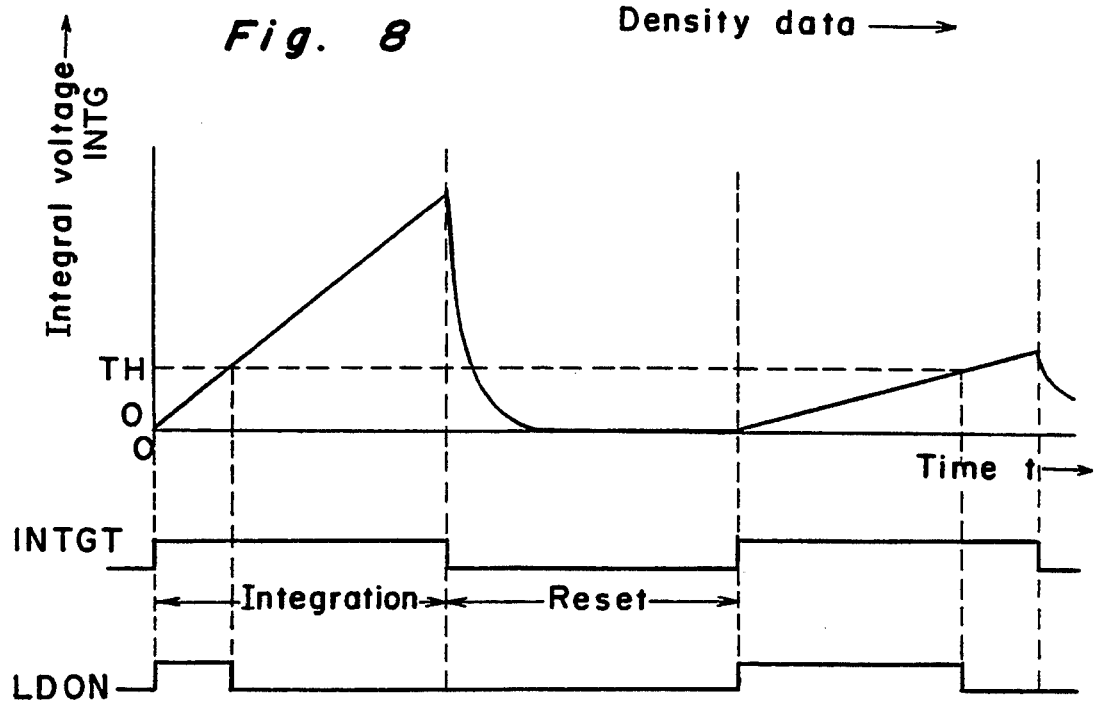
FIG. 8 is a timing chart of waveforms of the integral voltage INTG, the timing signal INTGT and the laser diode ON signal LDON showing an operation of an integrating circuit.

The density data corrected by the correction section 1 is converted into an analogue voltage IN by the D/A converter 2, and then, the converted analogue voltage IN is applied to the integrating circuit 3. The integrating circuit 3 integrates the analogue voltage IN as shown in FIG. 8. Namely, at the beginning of each integration period, the capacitor Ci for the integration has been completely discharged, and then, the integral voltage INTG is zero V. When the operation of the integrating circuit 3 enters the integration period, the integration of the input voltage IN is started, and the laser diode ON signal for representing the light emitting period of the semiconductor laser diode LD becomes the high level so as to start the laser diode LD in emitting a beam of light. Since the integration constant of the integrating circuit 3 is set at a relatively large value, the integral voltage INTG increases linearly in direct proportion to the integration time.

Then, the integral voltage INTG is compared with the threshold voltage TH. When the integral voltage INTG becomes larger than the threshold voltage TH, the laser diode ON signal LDON becomes the low level, and the light emission of the semiconductor laser diode LD is stopped. After the integration period has been passed, the integrating circuit 3 is reset, and then, the integral voltage INTG becomes zero V. Since an influence caused by the reset operation of the integration circuit 3 can not neglected when the integration period is shorter or the integration is performed in a higher speed, there is provided the reset period between respective integration periods corresponding to the print operation of each dot.

Figure 34:
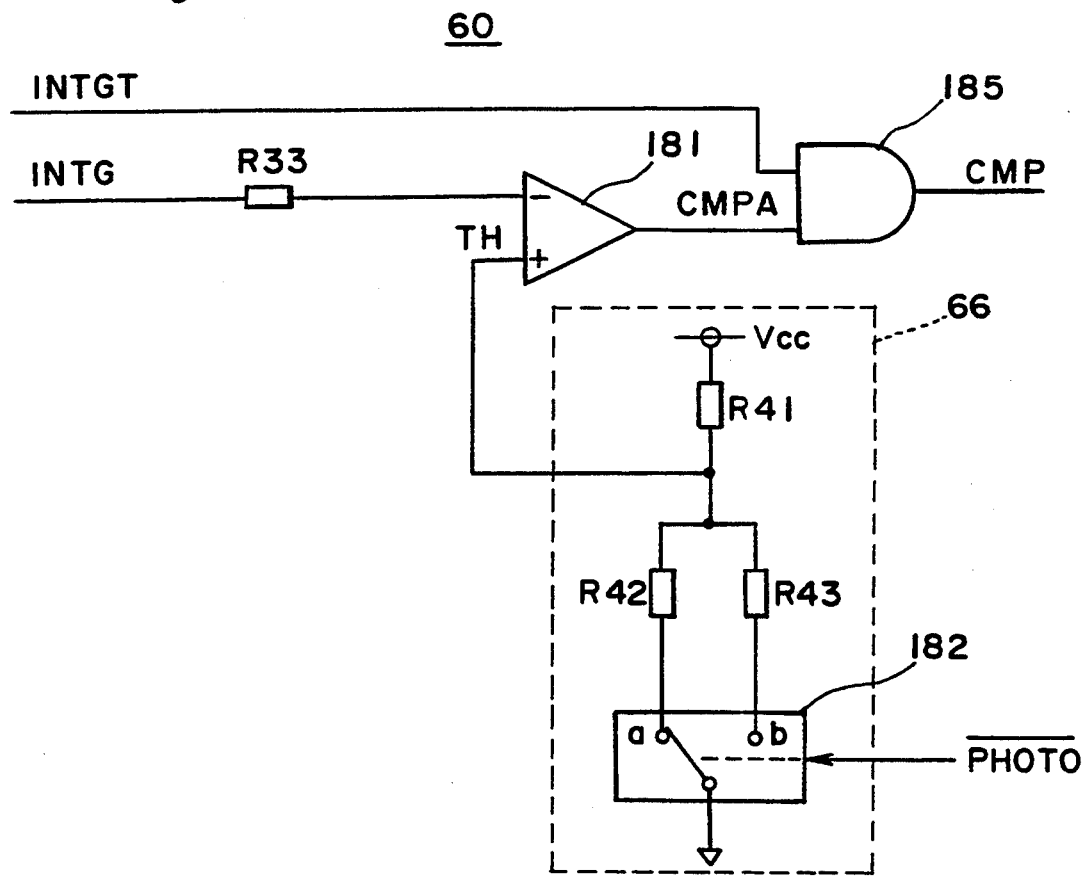
FIG. 34 is a schematic block diagram showing a composition of a modification of the comparator section shown in FIG. 33.

As described in detail later with reference to FIG. 34, the integrating circuit 3 is constituted so that the laser diode ON signal LDON having the high level is not outputted to the laser diode driver 5 for the reset period. By taking the influence into the laser diode ON signal for the reset period into the correction process, the influence caused by the reset can be dissolved.

As the input voltage IN becomes lower or the density data becomes larger, the gradient of the integral voltage INTG outputted from the integrating circuit 3 becomes smaller. If the integral voltage INTG does not become the threshold voltage TH at the end of the integration period, the light emitting period is equal to the integration period, and then, the light emitting period does not change. In order to solve this problems, the corrected data at the maximum density (the density=255) is set so that the integral voltage INTG becomes the threshold voltage TH at the end of the integration period as shown in FIG. 7.

Figure 13:
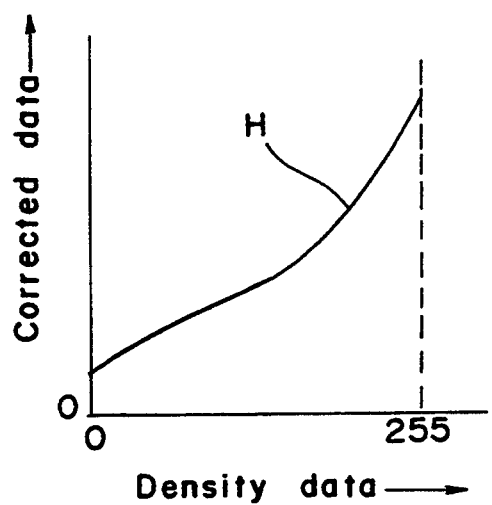
FIG. 13 is a graph of correction data used for a light emitting controller of a modification showing a relationship between the corrected data and the density data.

When the stabilization in a high density is regard as important or the input voltage IN is set so as to become larger as the density data becomes larger, the corrected data in the minimum density (the density=zero) are set at a value which is not equal to zero as shown in FIG. 13, because of the aforementioned reasons.

Figure 5:
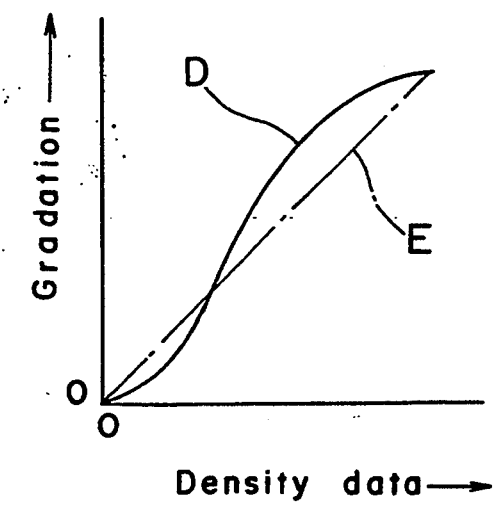
FIG. 5 is a graph of a $\gamma$ characteristic showing a relationship between the gradation and density data.

As is apparent from FIGS. 3 and 5, in a high density, the shift from the linear characteristic caused by using the density data integration method has a tendency to correct the shift from the linear characteristic caused by the aforementioned γ characteristic. Therefore, the degree of the correction becomes smaller, the precision of the correction can be heightened. The above process can be performed without the correction.

(a-3) High Speed Density Data Integrating Method Utilizing Two Systems

Figure 18:
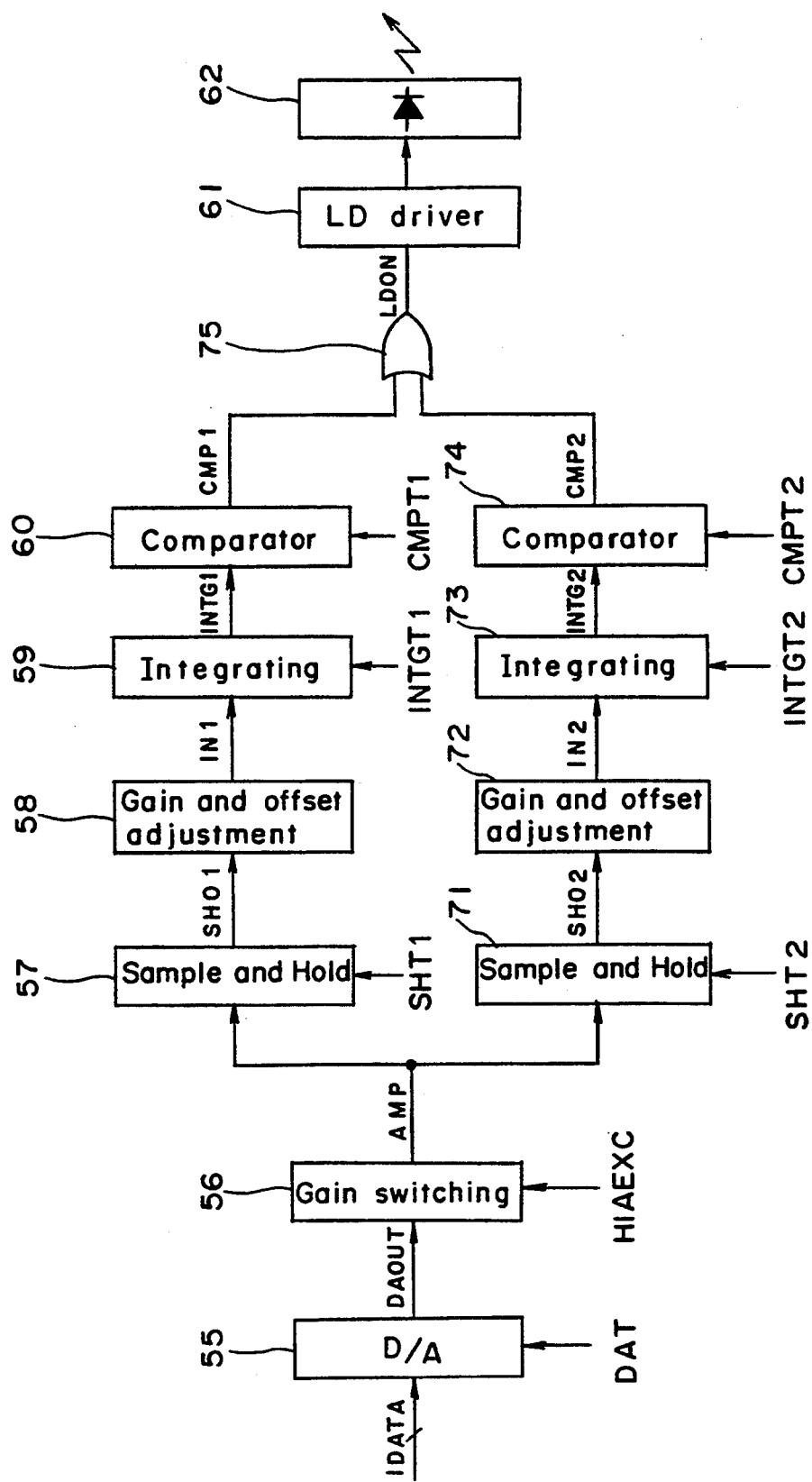
FIG. 18 is a schematic block diagram showing a composition of high speed two systems type print head controller of the laser printer of a modification of the preferred embodiment.

In an example shown in FIG. 8, there are provided the integration period and the reset period, alternately. However, when it is necessary to perform the integration in a higher speed, another one system comprising an integrating circuit and a comparator is provided in parallel to one system comprising the integrating circuit and the comparator, as shown in FIG. 18. Respective systems perform the integration and the reset, alternately.

Figure 9:
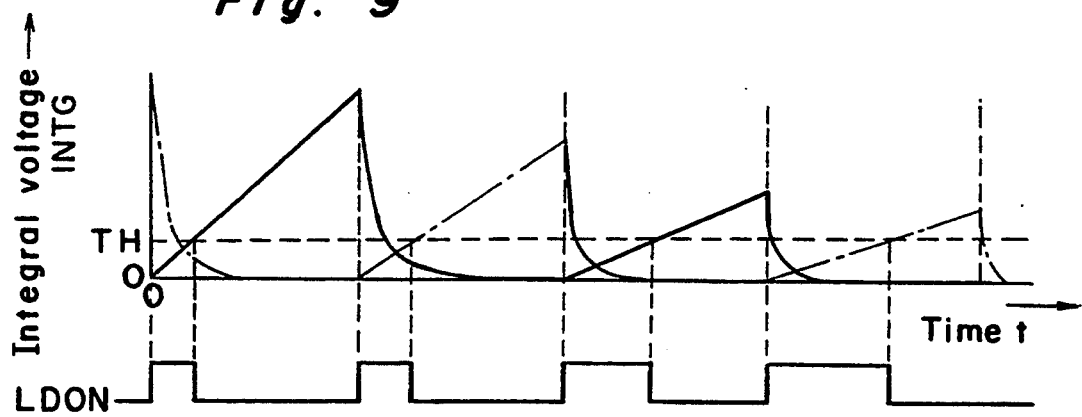
FIG. 9 is a timing chart of waveforms of the integral voltage INTG, the timing signal INTGT and the laser diode ON signal LDON showing an operation of two systems type light emitting controller.

FIG. 9 shows an example of the waveform of the integral voltage INTG in the case of the high speed density data integrating method utilizing the two systems. In FIG. 9, the real line shows an integral voltage outputted from the integrating circuit of one system, and the alternate long and short dash line shows an integral voltage outputted from the integrating circuit of another system. As compared with the waveform of the integral voltage INTG shown in FIG. 8, there is caused no influence from the output voltage when the integrating circuit is reset, and a loss of the time caused by providing the reset period becomes zero. Therefore, the integration can be performed in a higher speed. (a-4) Switching of Integration Time and Addition of Density Data When an original includes characters, a higher resolution is required, and when an original includes a photograph, a gradation characteristic having larger steps is required. However, it is difficult to obtain a higher resolution and a gradation characteristic having larger steps. If an image is printed according to the density data sent from the image reader without processing them, the resolution of the original density data can be maintained. In this case, however, if an original such as a photograph for which a gradation characteristic having larger steps is regarded as important is printed, the steps of the gradation is too small. On the other hand, if an image is printed using the continuous density data as one unit, the dynamic range increases. Therefore, the steps of the gradation can be increased. However, the resolution decreases in this case.

In the pulse width modulation method of the present preferred embodiment, the integral voltage obtained by integrating the density data is compared with the predetermined threshold voltage TH, and then, a pulse is generated. In this case, the threshold voltage TH is prefixed. Now, if the integration period is set at a longer period with keeping the frequency of the clock used upon outputting the density data as it is, plural density data are integrated for the same integration period, and then, pulses can be generated using plural density data as one unit.

Figure 10A:
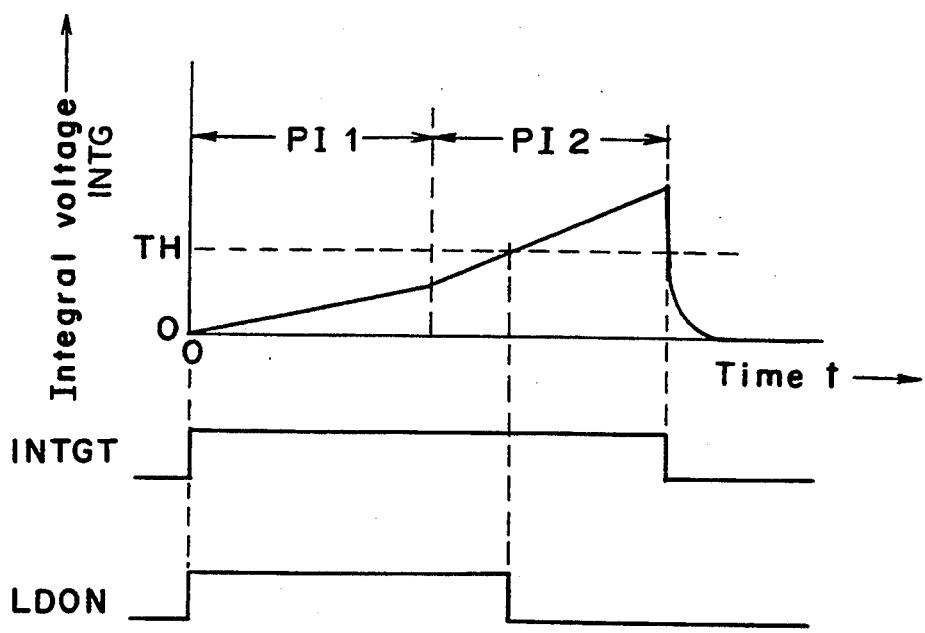
FIGS. 10a and 10b are timing charts of waveforms of the integral voltage INTG, the timing signal INTGT and the laser diode ON signal LDON showing an operation of another integrating circuit for an integration period longer than a predetermined fundamental period.

FIG. 10a shows an example of the waveform of the integral voltage INTG in a light emitting controller using the pulse modulation method wherein the integration is performed for two times the time period (referred to as a fundamental period hereinafter) corresponding to one dot to be printed. In FIG. 10a, PI1 represents an integration period corresponding to the first dot to be printed, and PI2 represents an integration period corresponding to the second dot to be printed. In this case, the threshold voltage TH is set at two times the threshold voltage which is set in the light emitting controllers shown in FIGS. 1a and 1b. The integration period may be set at non-integer times the fundamental period.

Figure 10B:
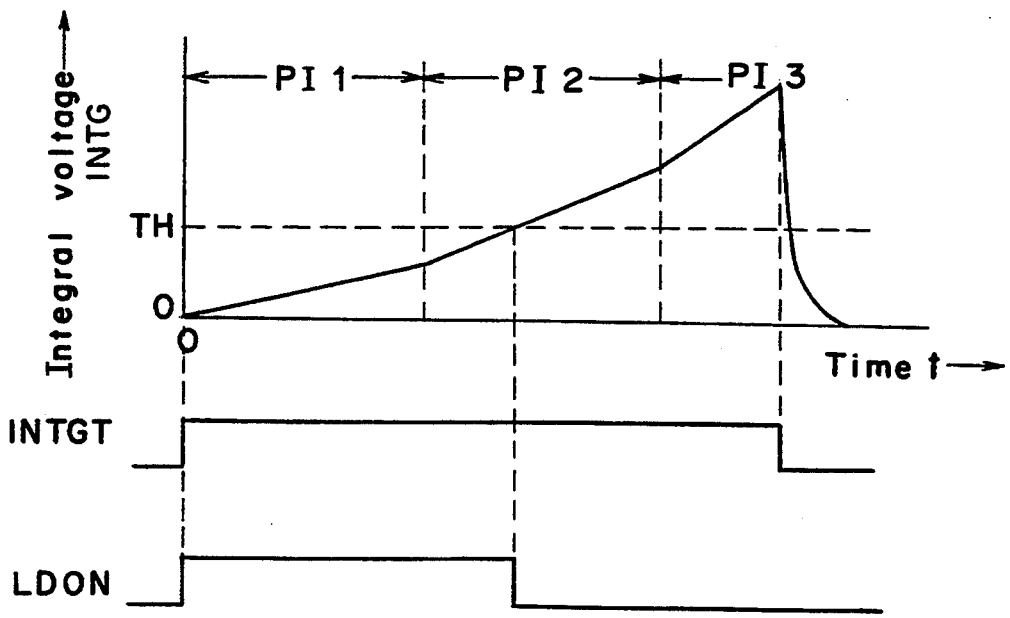

FIG. 10b shows an example of the waveform of the integral voltage INTG in a light emitting controller using the pulse modulation method wherein the integration is performed for two and half times the fundamental period.

If the system comprising the integrating circuit and the comparator is constituted so that the integration period can be switched among the fundamental period and integration periods which are longer than the fundamental period, the operator can select one of the different integration periods according to an original which he wishes to print in a high resolution and an original which he wishes to print in a gradation characteristic having large steps. For example, because of the reasons described in detail later, the integration period is set at one and half times the fundamental period in the case of giving priority to the resolution, and the integration period is set at two and half times the fundamental period in the case of giving priority to the gradation characteristic.

In order to select one of the integration periods, for example, a selection key may be provided on an operation panel. When the operator selects one of plural integration periods, the timing for generating the INTGT signal for representing the integration period is switched in one system comprising the integrating circuit and the comparator so that the integration period of the integrating circuit and the threshold voltage to be inputted to the comparator are switched simultaneously. Further, there may be provided in parallel two systems different integration periods and different threshold voltages each system comprising the integrating circuit and the comparator. In this case, either one of the two system is selected.

Practically, in the case of regarding the gradation characteristic as important, as the density data are integrated sequentially in a unit of the fundamental period for the set integration period, the weight of the density data which is integrated at the beginning of the integration becomes large since only the first density data contributes thereto at the beginning of the integration period. In order to regard the gradation characteristic as important, all the related density data preferably contributes to the integral voltage INTG on average.

In the present preferred embodiment, not only the integration is switched but also all the related density data are preadded and the sum thereof is used as the input voltage IN to be inputted to the integrating circuit 3.

Figure 11A:
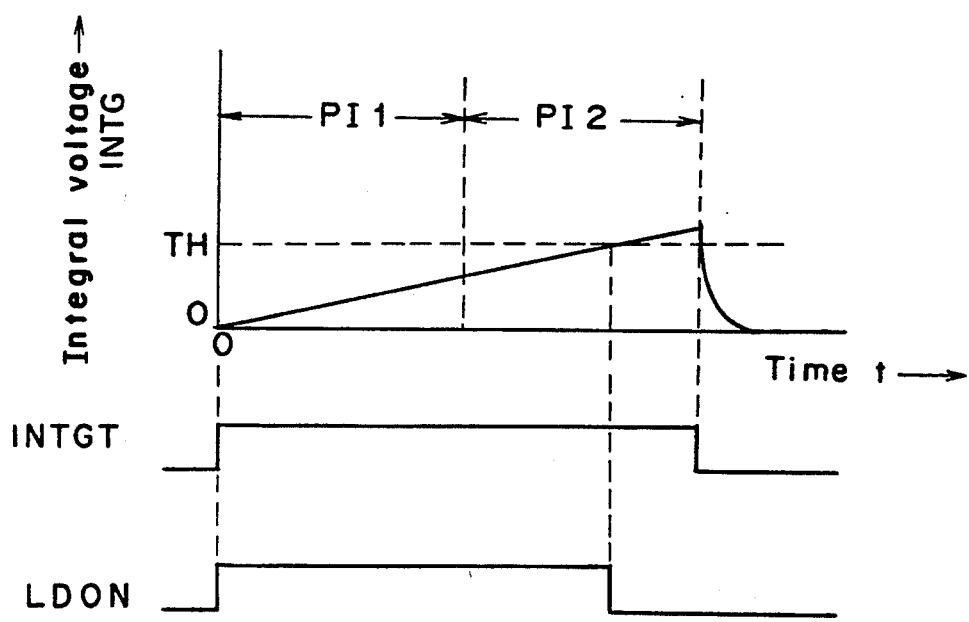
FIGS. 11a and 11b are timing charts of waveforms of the integral voltage INTG, the timing signal INTGT and the laser diode ON signal LDON showing an operation of another integrating circuit when added density data are inputted thereto.
Figure 11B:
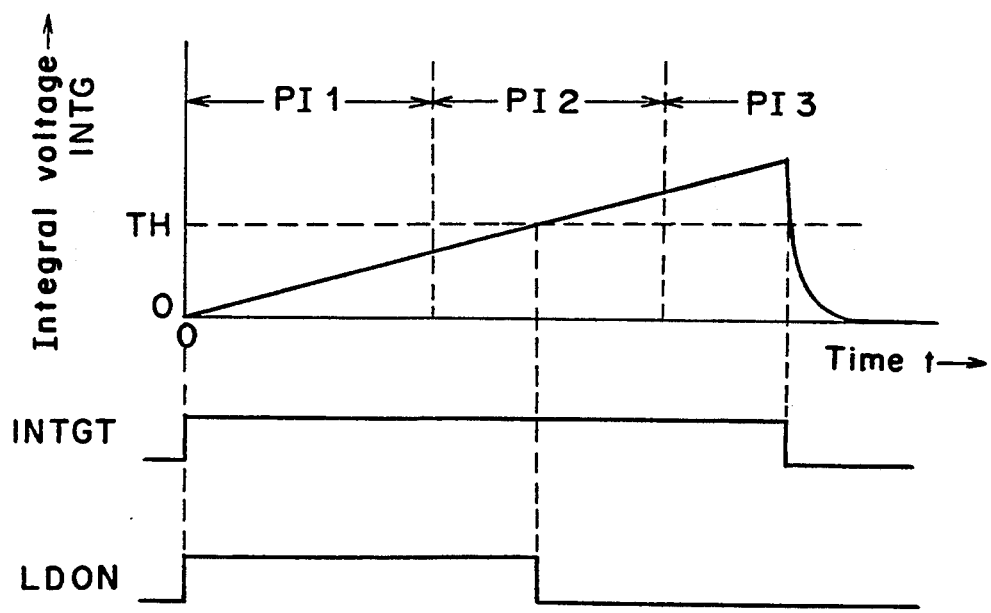

FIGS. 11a and 11b show examples of the waveforms of the integral voltage INTG in the light emitting controllers using the pulse modulation method, wherein the sum of the density data is used as the input voltage IN to be inputted to the integrating circuit 3 in the case of FIGS. 10a and 10b, respectively.

The average value of the density data may calculated and the calculated average value may be used as the input voltage IN to be inputted to the integrating circuit 3. In this case, it is unnecessary to switch the threshold voltage. However, the steps of the gradation does not increase in this case.

Further, it is necessary to take the stabilization of the electrophotographic process into consideration. In the present preferred embodiment, the time period corresponding to one dot to be printed is 56 nsec. of the fundamental period time, and it is difficult to obtain a stable gradation characteristic of the electrophotographic process in the case of using the pulse modulation method for a time period of one dot. Therefore, even in the case of giving priority to a high resolution suitable for printing an original including characters, the integration period is preferably set at an time period longer than the fundamental period. Therefore, in order to establish a relatively better stabilization of the electrophotographic process and establish a relatively higher resolution, the integration period is set at one and half the fundamental period in a standard mode of the present preferred embodiment. In this case, the sum of one and half density data is calculated, and the calculated sum thereof is used as the input voltage IN to be inputted to the integrating circuit 3.

On the other hand, in a photograph mode for giving priority to the high gradation characteristic, the integration period is set at two and half the fundamental period. In this case, the sum of two and half density data is calculated, and the calculated sum is used as the input voltage IN to be inputted to the integrating circuit 3. It is to be noted that non-integer times the fundamental period is adopted in the photograph mode in order to prevent from generating any false line. This is described in the paragraph (d) in detail later. Since the standard mode and the photograph mode can be selectively switched, the gradation characteristic and the resolution can be selected depending on each original.

(a-5) Stabilization of Gradation in Low Density or High Density

Figure 12A:
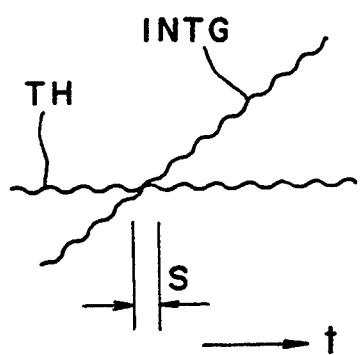
FIGS. 12a and 12b are waveforms of the integral voltage INTG and a threshold voltage TH on which a noise is superimposed.
Figure 12B:
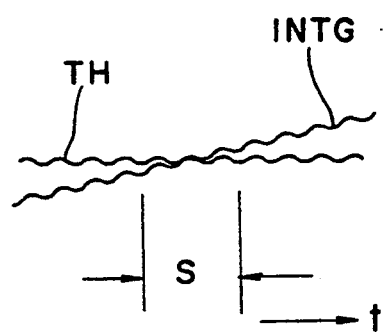

First of all, the stabilization of the gradation in a low density is described below. As shown in FIGS. 12a and 12b, there are superimposed some noises on the integral voltage INTG and the threshold voltage TH in practical. Therefore, there is a dispersion in an intersection between the integral voltage INTG and the threshold voltage TH on the elapsed time. As is apparent from FIGS. 12a and 12b, as the gradient of the integral voltage INTG on the elapsed time becomes larger, the intersection time becomes shorter, and the dispersion S thereof becomes smaller.

Therefore, in the case that the stabilization of the gradation characteristic in a low density is regarded as important such as a case of the present preferred embodiment, for example, the input voltage IN to be inputted to the integrating circuit 3 is preferably set at a larger value in a low density as shown in FIG. 7, and the gradient of the integral voltage INTG is preferably set at a larger value. Due to this, the input voltage IN is set at a relatively larger value in a low density, and is set at a relatively smaller value in a high density. In this case, since it is necessary to set the ON period of the laser diode ON signal LDON at a relatively longer value as the density data becomes larger, the laser diode ON signal LDON is turned on when the integral voltage INTG outputted from the integrating circuit 3 becomes smaller than the threshold voltage TH, and the laser diode ON signal LDON is turned off when the integral voltage INTG outputted from the integrating circuit 3 becomes equal to or larger than the threshold voltage (See FIG. 2a).

On the other hand, in the case that the stabilization of the gradation characteristic in a high density is regard as important, as shown in FIG. 13, the density data are corrected so that the input voltage IN is set at a relatively smaller value in a low density and is set at a relatively larger value in a high density. In this case, the light emitting period is started at an intersection between the integral voltage INTG and the threshold voltage TH, and is finished at the end of the integration period (See FIG. 2b). One of the advantages of this method is to reject the influence of the noise in a background of an image when the threshold voltage TH is set at a suitable value.

In the method for setting the input voltage IN at a larger value in a high density, if there is caused an influence of the integral voltage INTG upon resetting the integrating circuit 3, a large influence is caused thereon particularly in a low density, and then, the pulse width faithfully does not correspond to the density data. Due to this, the influence caused upon resetting the integrating circuit 3 is preferably removed upon turning off the laser diode ON signal LDON.

Figure 14:
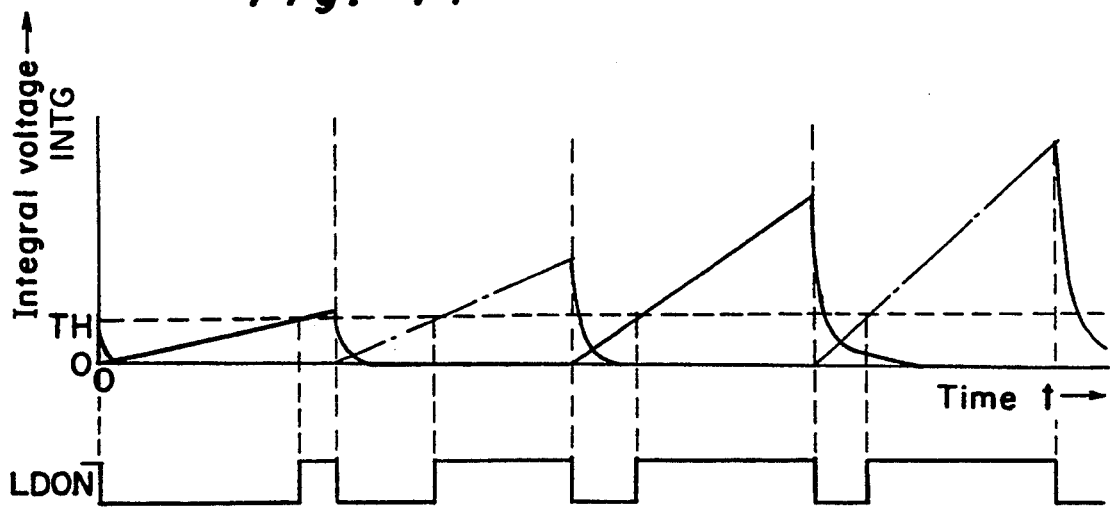
FIG. 14 is a timing chart of waveforms of the integral voltage INTG and the laser diode ON signal LDON showing an operation of an integrating circuit of two systems type light emitting controller of a modification of the preferred embodiment according to the present invention.

FIG. 14 shows an example of waveforms of the integral voltage INTG and the laser diode ON signal LDON in the case of the high speed two systems type light emitting controller using the above-mentioned method for setting the input voltage IN at a larger value in a high density.

The amplitude of the integral voltage INTG outputted from the integrating circuit 3 is preferably set at a value as small as possible in order to remove unnecessary noise. In the density data integration method of the present preferred embodiment, an amplitude thereof can be established in an important density (either a low density or a high density), and the amplitude thereof becomes small in another density. Therefore, an average level of the noise can be lowered.

(b) Composition of Light Emitting Controller of Laser Printer

Figure 15:
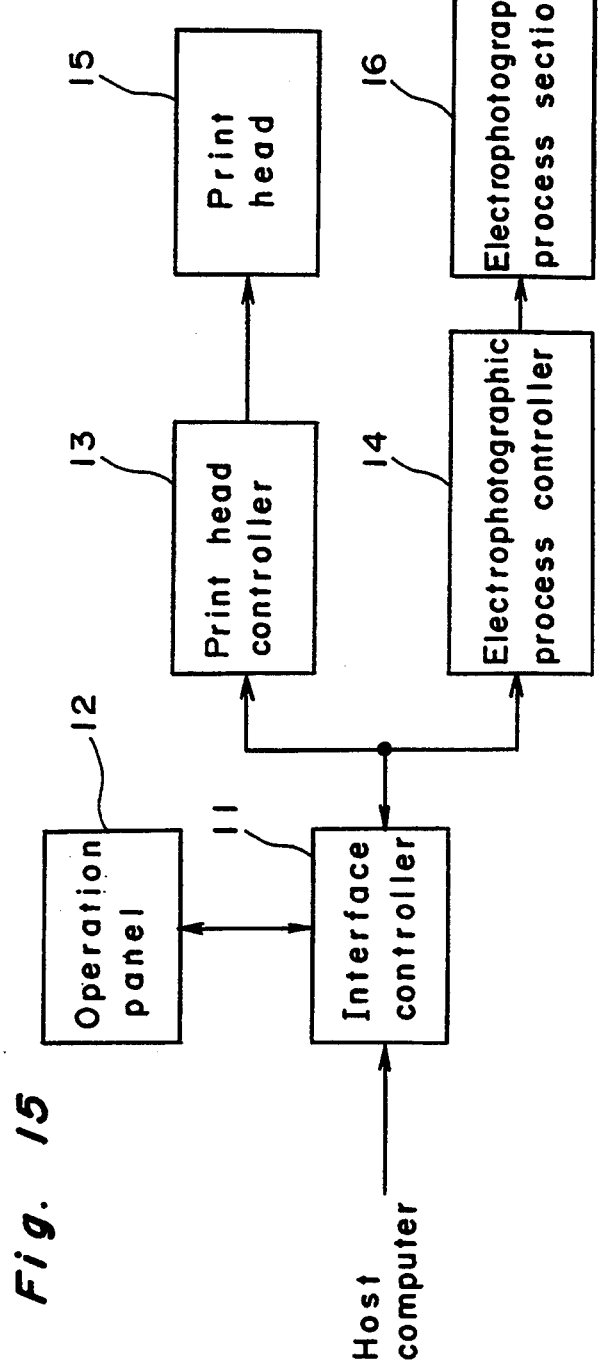
FIG. 15 is a schematic block diagram showing the whole composition of a laser printer of the preferred embodiment according to the present invention.

FIG. 15 is a schematic diagram showing the whole composition of the laser printer of the present preferred embodiment according to the present invention.

Referring to FIG. 15, density data and print control data sent from an image reader are received by an interface controller 11. An operation panel 12 transmits various kinds of instructions given by the operator to the interface controller 11, and also displays operation statuses of the laser printer. The interface controller 11 transmits the density data to a print head controller 13 and transmits control signals to an electrophotographic process controller 14 according to these instructions and data. The print head controller 13 enables a polygon mirror of a print head 15 to rotate responsive to the density data, and also enables the semiconductor laser diode LD to emit a beam of light so as to form an electrostatic latent image on a photoconductive drum of the electrophotographic process section 16. On the other hand, the electrophotographic process controller 14 controls the electrophotographic process section 16 responsive to forming the latent image so as to print an image on a piece of plain paper in the electrophotographic process in a manner well known to those skilled in the art.

Figure 16:
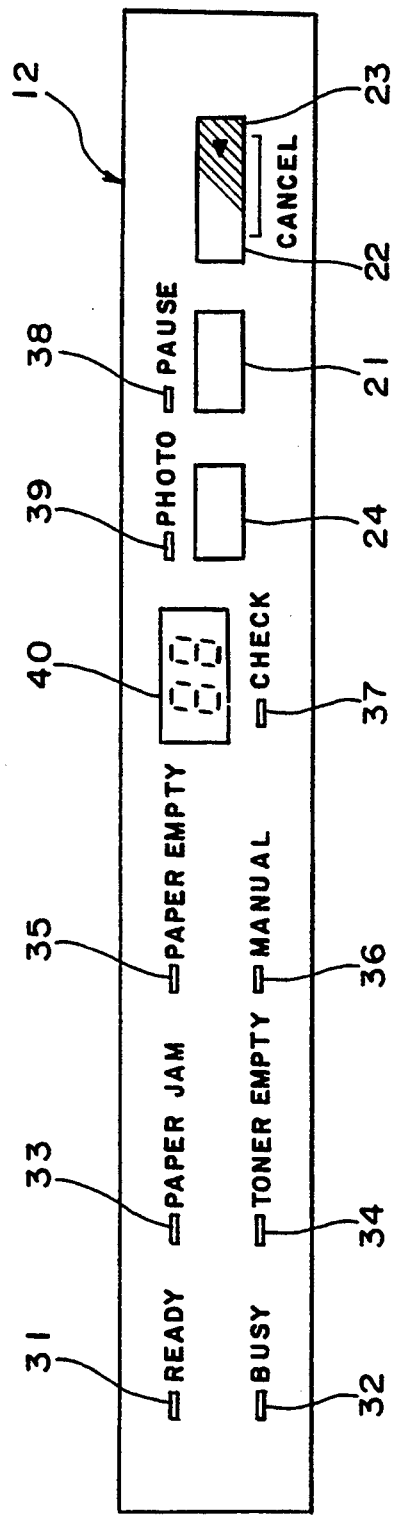
FIG. 16 is a front view of an operation panel of the laser printer shown in FIG. 15.

FIG. 16 is a front view showing an operation panel 12. In FIG. 16, 21 to 24 denote input keys, and 30 to 40 denote display devices.

Referring to FIG. 16, a key 21 is a PAUSE key for temporarily stopping the print operation. A key 23 is a SHIFT key, and becomes a CANCEL key for interrupting the print operation when pressing both the keys 22 and 23 simultaneously. A key 24 is a key for selecting one of the standard mode and the photograph mode. Further, a display device 39 is a light emitting diode (referred to as an LED hereinafter) which is turned on when the photograph mode is set.

Figure 17:
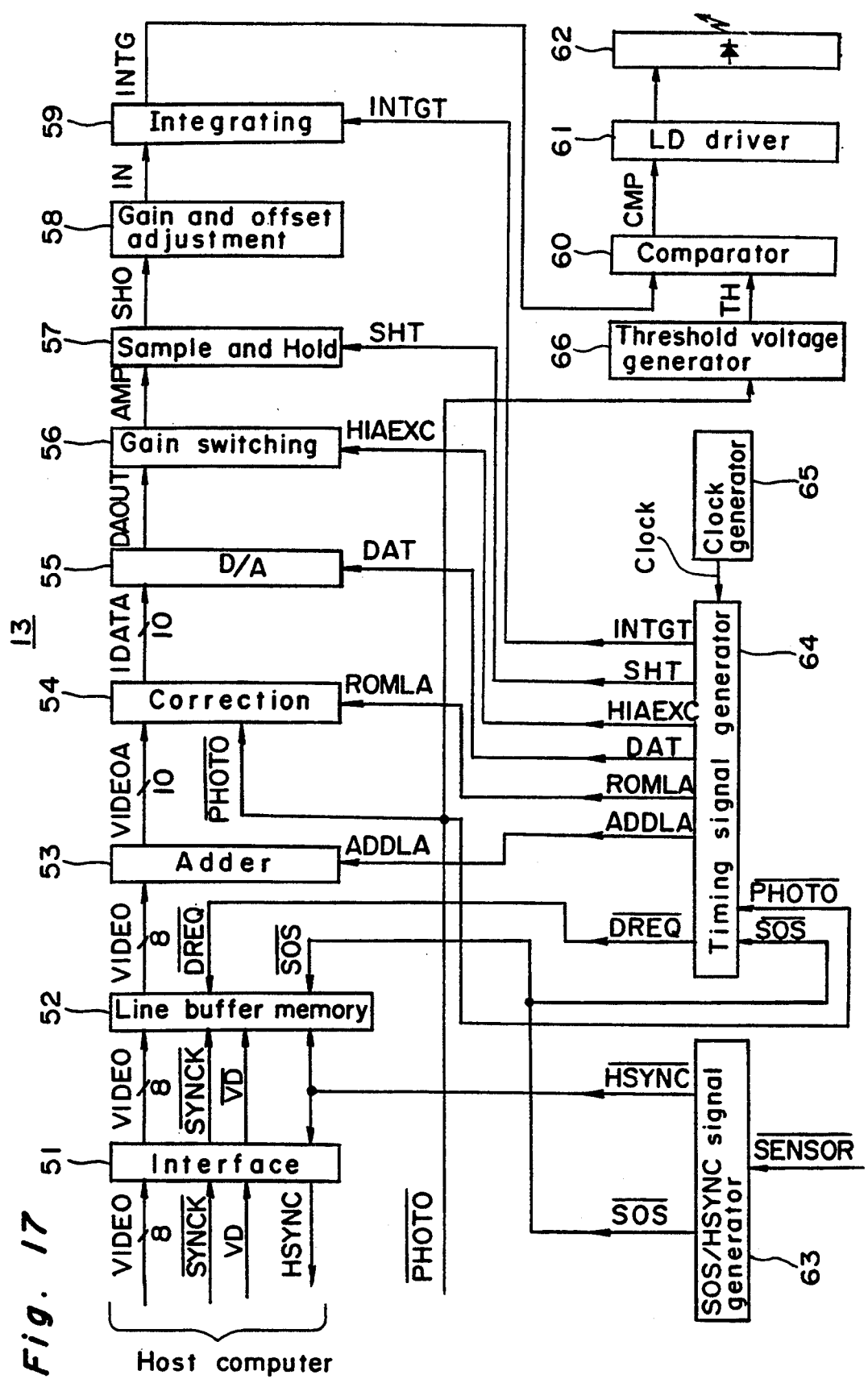
FIG. 17 is a schematic block diagram showing a composition of a print head controller of the laser printer shown in FIG. 15.

FIG. 17 is a schematic block diagram showing a composition of the print head controller 13.

Referring to FIG. 17, an interface section 51 receives an image signal VIDEO, a synchronizing signal $\overline{\text{SYNCK}}$ and an image area signal VD for representing an area of an image in a subscan direction through an interface controller 11 from a host computer such as an image reader, and transmits them to a line buffer memory 52. On the other hand, a horizontal synchronizing signal $\overline{\text{HSYNC}}$ is transmitted from an SOS/HSYNC signal generator 63 to the interface section 51 and the line buffer memory 52.

The line buffer memory 52 is a buffer memory for absorbing the difference between a frequency (about 13 MHz) of a clock of the image signal VIDEO received from the image reader through the interface section 51 and a frequency (about 17 MHz) of a clock for printing of the printer, and a first-in first-out memory (referred to as an FIFO memory hereinafter) on the market is used as the line buffer memory 52.

An adder section 53 calculates the sum (referred to as the image sum data hereinafter) VIDEOA composed of the image data VIDEO of 1.5 dots or 2.5 dots sent from the line buffer memory 52 in order to improve the gradation characteristic, and outputs them to a correction section 54. The correction section 54 corrects the image sum data VIDEOA corresponding to the integration of an integrating circuit 59 and performs a γ-correction therefor, referring to a look-up table stored in a ROM included therein, and outputs the corrected digital image data IDATA to the D/A converter 55. The D/A converter 55 converts the digital image data IDATA corrected by the correction section 54 into an analogue voltage DAOUT, and outputs them to a gain switching section 56.

The gain switching section 56 switches the gain for amplifying the analogue voltage DAOUT every one line in the subscan direction or amplifies it with different gains in order to improve the gradation characteristic up to a high density, and outputs an analogue voltage AMP to a sample and hold section 57. The sample and hold section 57 samples and holds the analogue voltage AMP in order to stabilize the input voltage IN inputted to the integrating circuit 59, and outputs the sampled and held analogue voltage SHO to a gain and offset adjustment section 58. The gain and offset adjustment section 58 adjusts the gain of the whole system and the offset for the input voltage SHO, and outputs the adjusted analogue voltage IN to the integrating circuit 59.

The integrating circuit 59 integrates the analogue input voltage IN inputted from the gain and offset adjustment section 58, and outputs the integral voltage INTG to a comparator 60. The comparator 60 compares the integral voltage INTG outputted from the integrating circuit 59 with the threshold voltage TH outputted from a threshold voltage generator 66 so as to output a pulse signal CMP for enabling a semiconductor laser diode 62 of the print head 15 through a laser diode driver 61.

The laser diode driver 61 drives the semiconductor laser diode 62 of the print head 15 responsive to the pulse signal outputted from the comparator 60. It is to be noted that a circuit for automatically controlling the output of the semiconductor laser diode 62, however, the description thereof is omitted therein since the circuit is well known to those skilled in the art. The laser diode driver 61 comprises a light emitting area controller for outputting a signal for enabling the semiconductor laser diode 62 to emit a beam of light in the main scan direction and the subscan direction, and a compulsory light emitting controller for compulsorily enabling the semiconductor laser diode 62 to emit a beam of light in order to make a beam of light incident onto a start-of-scan sensor (not shown and referred to as an SOS sensor hereinafter) in an area other than the light emitting area, however, the description thereof is omitted therein since the circuit is well known to those skilled in the art.

Further, the SOS/HSYNC signal generator 63 generates the synchronizing signals $\overline{SOS}$ and $\overline{HSYNC}$ responsive to a detection signal outputted from the SOS sensor. A timing signal generator 64 generates various kinds of timing signals $\overline{DREQ}$, ADDLA, ROMLA, DAT, HIAEXC, SHT and INTGT to be outputted to respective sections 52 to 59 responsive to a clock signal generated by a clock generator 65, the synchronizing signal $\overline{SOS}$, and a photograph mode signal $\overline{PHOTO}$. As described later, the above timing signals are generated at different timings in the standard mode and the photograph mode. Namely, responsive to the photograph mode signal $\overline{PHOTO}$ which is set by the key 24, the above timing signals are generated for integration in the standard mode and the photograph mode, as shown in FIGS. 21, 22, 31 and 32. In the present preferred embodiment, the clock generator 64 generates the timing signal $\overline{DREQ}$ (See FIG. 21 etc.) for reading data responsive to the clock signal outputted from the clock generator 65, and further generates the other timing signals using a hard logic circuit which is well known to those skilled in the art responsive to the above timing signal $\overline{DREQ}$.

(c) Composition of High Speed Two Systems Type Light Emitting Controller of Laser Printer In the case of generating the pulse signal for representing the light emitting time of the semiconductor laser diode LD using the above-mentioned density data integration method, there are provided the integration period and the reset period alternately in the integrating circuit 59 in order to remove the influence of the reset operation. In this case, as described in the above paragraph (a-3), the two systems each system comprising the integrating circuit and the comparator are provided so as to process the density data in a higher speed. Namely, respective systems integrate the density data alternately.

FIG. 18 shows a partial block comprising the sections 55 to 62 of two systems type print head controller comprising the first and second systems. In FIG. 18, 1 or 2 is appended to the references of various kinds of signals in order to distinguish the system to be used.

Referring to FIG. 18, the first system comprises the sample and hold section 57, the gain and offset adjustment section 58, the integrating circuit 59 and the comparator 60. The second system comprises a sample and hold section 71, a gain and offset adjustment section 72, an integrating circuit 73 and a comparator 74. The sections 71 to 74 are constituted as well as the sections 57 to 60, respectively. The first and second systems are connected in parallel between the gain switching section 56 and an AND gate 75.

The analogue voltage AMP is outputted to the sample and hold sections 57 and 71. A comparison signal CMP1 outputted from the comparator 60 is inputted to the first input terminal of the AND gate 75, and a comparison signal CMP2 outputted from the comparator 74 is inputted to the second input terminal of the AND gate 75. A signal outputted from the output terminal of the AND gate 75 is inputted as a laser diode ON signal LDON to the semiconductor laser diode 62 through the laser diode driver 61. The timing of the integration in the first system is different from that in the second system (See FIGS. 31 and 32), and the first and second systems perform the same processes except for this point. The two systems type print head controller constituted as described above can process data in a higher speed as compared with the above-mentioned one system type print head controller shown in FIG. 17, as shown in FIGS. 9 and 14.

(d) Addition of Density Data of Plural Pixels

In the present preferred embodiment, the density data having a resolution of 400 dpi stored in the line buffer memory 52 are read out sequentially using the clock signal $\overline{DREQ}$ having a period of 56 nsec. The density data stored in the line buffer memory 52 are data which have been received from the host computer, and are also density data in a unit for reading an image such as a pixel of a linear CCD sensor. Upon printing an image, if the image is formed in a unit of the received density data, the resolution of the formed image does not deteriorate. However, if the light emission is controlled for a light emitting period within the period (56 nsec.) of the above one clock, it is difficult to obtain a stabilized gradation characteristic in the electrophotographic process.

In order to solve the above problems, the density data of one pixel and the subsequent density data of the next one pixel are added and an image is printed in a unit of two clocks. In this case, the gradation characteristic can be stabilized, however, the resolution of the printed image becomes half that in the case of printing the image in a unit of one clock.

In order to establish both a relatively better gradation characteristic and a relatively higher resolution, an image is printed with a suitable period between the period of one clock and the period of two clocks. In the present preferred embodiment, an image is printed in a unit of one and half clocks in the standard mode. In this case, the resolution of the printed image becomes about ten lines/mm, resulting in establishing a relatively higher resolution.

In the standard mode, it is necessary to generate density data for printing an image in a unit of one and half clocks from the density data read out from the line buffer memory 52. Therefore, among three continuous density data, the first density data and half the second or middle density data are added, and then, half the middle density data and the third or last density data are added. Then, the two added data obtained from three density data are outputted with a period of one and half clocks, and a dot corresponding to the two added data is printed on a piece of paper. The observed degree of the gradation characteristic becomes one and half times that in the case without the above addition. The addition process is repeated in a unit of a period of three clocks.

Further, in the present preferred embodiment, there is provided the photograph mode suitable for reproducing a half tone image, and then, a stabilized gradation characteristic can obtained in the electrophotographic process. In this case, plural density data are added, and an image is printed with a period of plural clocks such as three clocks. However, if a half tone image is reproduced with a period of three dots, longitudinal lines with a period of three dots can be seen. In order to prevent the longitudinal lines from being printed, it is necessary to provide a screen angle of 45° by shifting dots every one dot in the subscan direction.

If the period is set at a value which is non-integer times the period of clock such as a period of two and half clocks wherein the resolution of the printed image is 6.4 lines/mm in order to solve the above problems, the above-mentioned longitudinal lines can not seen. Therefore, the data are processed in a unit of five density data in the photograph mode. Namely, among five density data, the first and second density data and half the third density data are added, and then, half the third density data and the fourth and fifth density data are added. Then, and the added two density data are outputted with a period of two and half clocks so as to print a dot corresponding to the added density data.

The operator can select either one of the above-mentioned two addition modes, either one of the standard mode and the photograph mode, namely the operator can select the number of density data to be added by pressing the key 24 of the operation panel 12, Responsive to this selection, the photograph mode signal $\overline{PHOTO}$ is generated. Namely, when the standard mode is selected, the photograph mode signal $\overline{PHOTO}$ having the high level is generated. On the other hand, when the photograph mode is selected, the photograph mode signal $\overline{PHOTO}$ having the low level is generated. Responsive to the photograph mode signal $\overline{PHOTO}$, the timing signal generator 64 generates the timing signal ADDLA for selecting the number of the density data to be added to the adder section 53.

Next, the addition of the density data of plural pixels will be described below, concretely.

Figure 19:
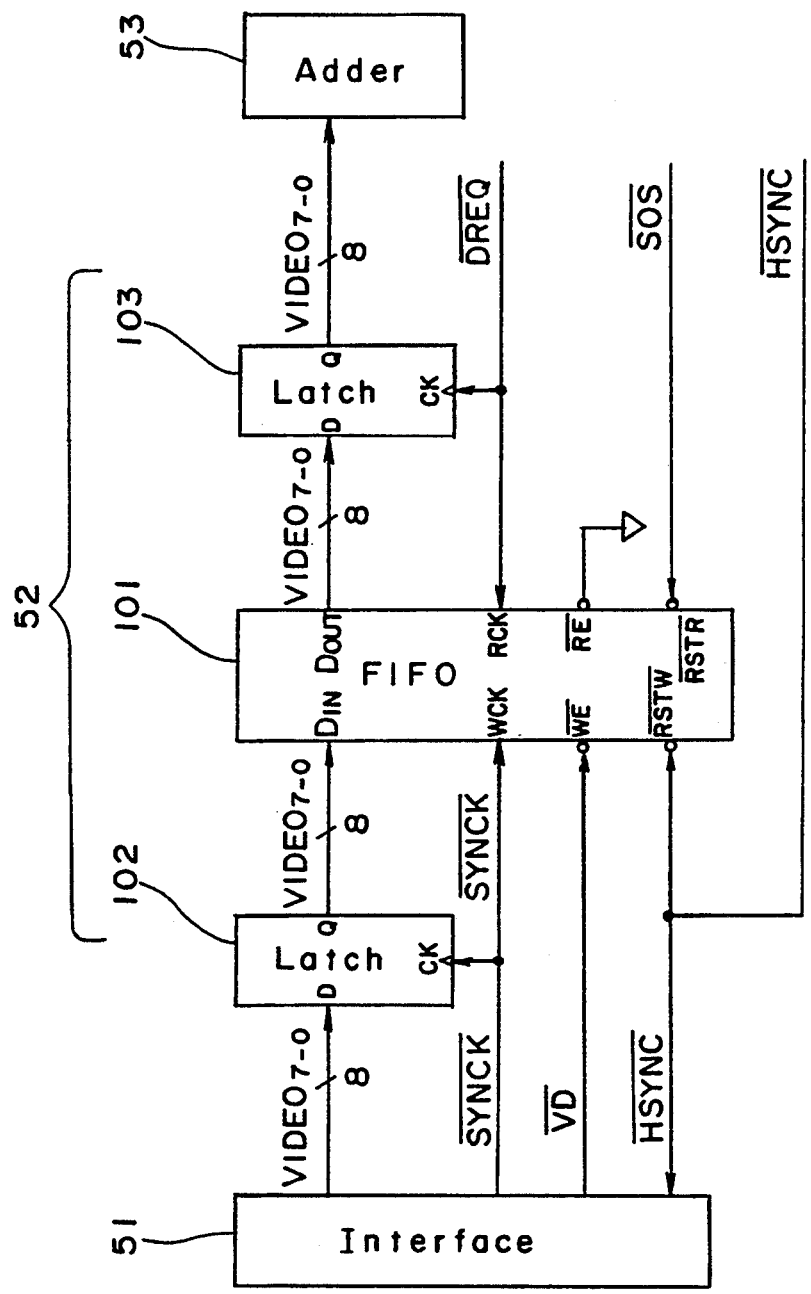
FIG. 19 is a schematic block diagram showing a composition of a line buffer memory of the print head controller shown in FIG. 17.

FIG. 19 shows a composition of the line buffer memory 52.

Referring to FIG. 19, the line buffer memory 52 comprises an FIFO memory 101 and two latches 102 and 103, and is provide for buffering the difference between the frequency of the clock for transferring data sent from the image reader and the frequency of the clock for printing an image in the laser printer. After the image data VIDEO of 8 bits sent from the interface section 51 are latched in the latch 102, the image data VIDEO are written in the FIFO memory 101 at timings represented by the synchronizing signal $\overline{SYNCK}$ sent from the image reader. The image signal VIDEO stored in the FIFO memory 101 are read out at timings represented by the clock signal $\overline{DREQ}$ which is supplied from the timing signal generator 64, and then, the read image data VIDEO are latched in the latch 103. Thereafter, the latched image data VIDEO of 8 bits are outputted to the adder section 53.

Figure 20:
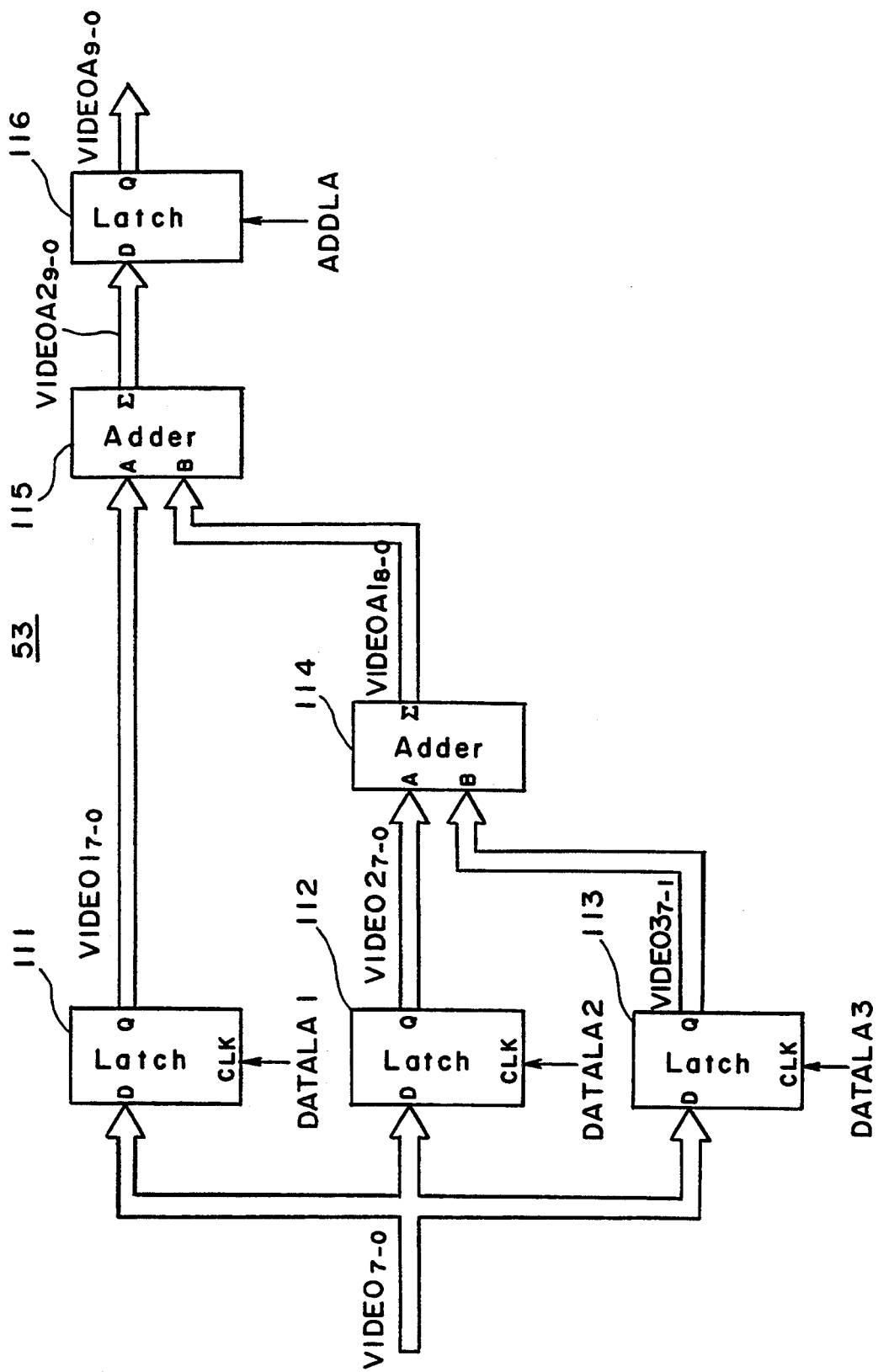
FIG. 20 is a schematic block diagram showing a composition of an adder section of the print head controller shown in FIG. 17.

FIG. 20 shows a composition of the adder section 53.

Referring to FIG. 20, the adder section 53 adds the image data (the density data) of 8 bits sent from the line buffer memory 53 in the selected one of the aforementioned two addition modes. In the standard mode, one and half image data are added. On the other hand, in the photograph mode, two and half image data are added. The operation mode in the adder section 53 is set according to the photograph mode signal $\overline{PHOTO}$, wherein the photograph mode signal is the high level in the standard mode and is the low level in the photograph mode.

The density data VIDEO of 8 bits sent from the line buffer memory 52 are latched in latches 111, 112 and 113 at timings represented by the timing signals DATALA1, DATALA2 and DATALA3, respectively. The density data VIDEO2 of 8 bits outputted from the latch 112 and the density data VIDEO3 of 7 bits outputted from the latch 113 are added by the adder 114. At that time, the data of the least significant bit of the density data VIDEO which are inputted to the latch 113 are not inputted to the adder 114, and the data of 7 bits outputted from the latch 113 are inputted to the adder 114 with shifting one bit toward the least significant bit. Therefore, half the data latched in the latch 113 are added to the density data inputted from the latch 112 by the adder 114. The added data VIDEO1 of 9 bits outputted form the adder 114 are added to the data of 8 bits outputted from the latch 111 by the adder 115, and the adder 115 outputs the added data VIDEOA2 of 10 bits to the latch 116, which are latched in the latch 116 at timings represented by the timing signal ADDLA.

Figure 21:
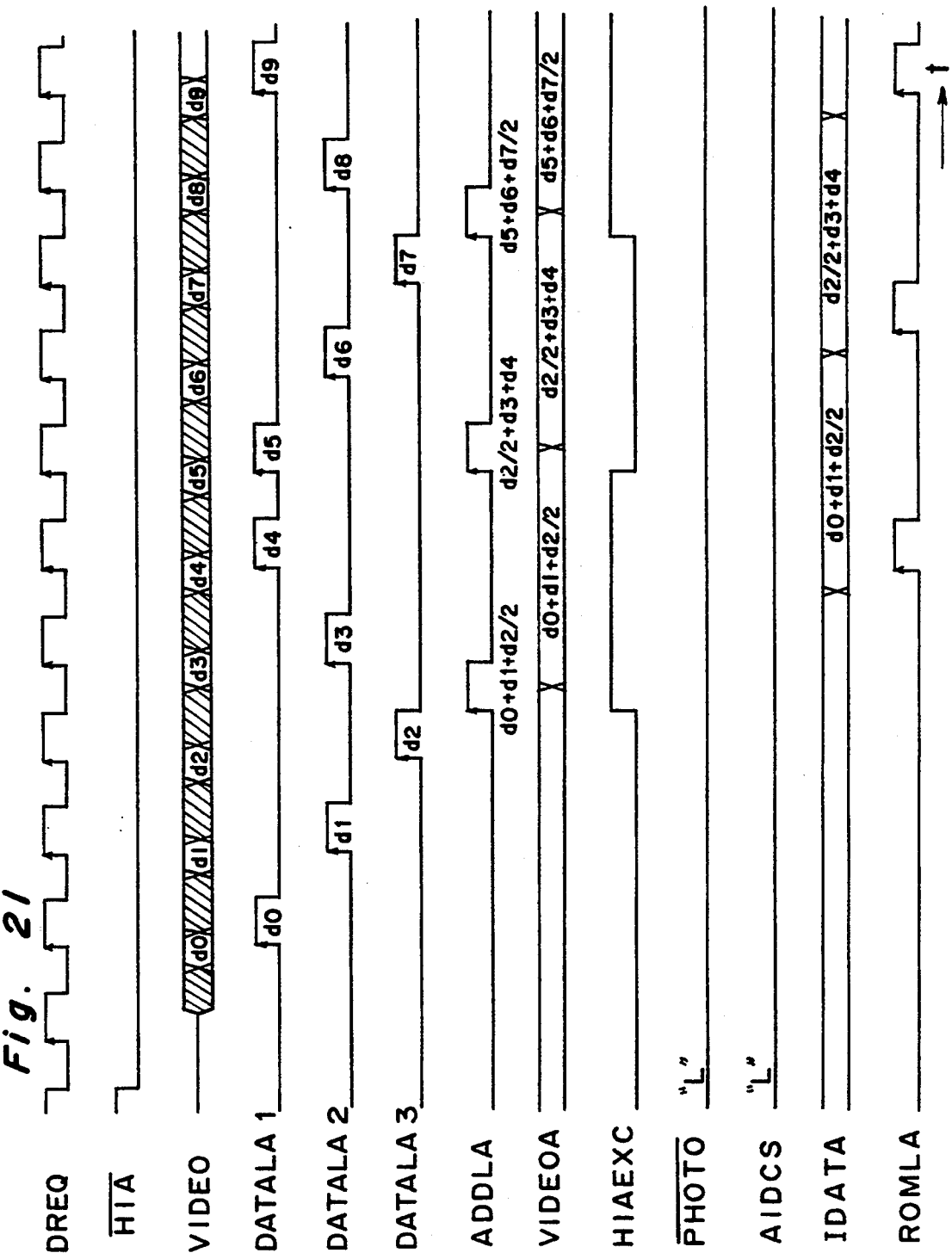
FIG. 21 is a timing chart showing an operation in a photograph mode of the adder section shown in FIG. 20.

FIG. 21 is a timing chart showing the addition operation in the photograph mode of the adder section 53.

Referring to FIG. 21, a timing signal $\overline{HIA}$ is provided for representing an image area in the main scan direction upon the scan operation in the main scan direction. The timing signal $\overline{HIA}$ becomes the low level a predetermined time after the $\overline{SOS}$ signal is outputted from the SOS sensor, and thereafter, the timing signal $\overline{HIA}$ becomes the high level when a time corresponding to the image area has been passed. When the timing signal $\overline{HIA}$ becomes the low level within the image area, the clock signal $\overline{DREQ}$ for reading the image data sent from the line buffer memory 52 is applied to the line buffer memory 52, and the density data VIDEO are outputted at the leading edge of the clock signal $\overline{DREQ}$. As shown in FIG. 21, at a leading edge after the second leading edge of the clock signal $\overline{DREQ}$, the density data VIDEO are outputted sequentially from the address zero. In FIG. 21, dn denotes image data VIDEO of the address n, wherein n is an integer.

Respective timing signals DATALA1, DATALA2 and DATALA3 for latching the density data VIDEO are generated at timings with a period of five clocks $\overline{DREQ}$ as shown in FIG. 21. The timing signal DATA- LA1 to be supplied to the latch 111 is generated so that the latch 111 can latch the 5m-th and (5m+4)-th density data, wherein m is zero or a positive integer. The timing signal DATALA2 to be supplied to the latch 112 is generated so that the latch 112 can latch the (5m+1)-th and (5m+3)-th density data, wherein m is zero or a positive integer. The timing signal DATALA3 to be supplied to the latch 113 is generated so that the latch 113 can latch the (5m+2)-th density data, wherein m is zero or a positive integer. The timing signal ADDLA to be supplied to the latch 116 for latching the added two and half density data is generated every two and half clocks.

The first period of the addition operation in the adder section 53 will be described below.

The data d0 of the address zero are latched in the latch 111 at a timing represented by the timing signal DATALA1, and then, the data d1 of the address one are latched in the latch 112 at a timing represented by the timing signal DATALA2. Thereafter, the data d2 of the address two are latched in the latch 113. Then, the data d0 of the address zero, the data d1 of the address one and half the data d2 of the address 2 are added by the adder 115, and the added two and half data VIDEOA2 are outputted from the adder 115 to the latch 116. Thereafter, the added two and half data VIDEOA2 are latched in the latch 116 at a timing represented by the timing signal ADDLA, and are outputted as the image data VIDEOA.

Thereafter, the data d3 of the address three are latched in the latch 112 at a timing represented by the timing signal DATALA2, and then, the data d4 of the address four are latched in the latch 111 at a timing represented by the timing signal DATALA1. Then, half the data d2 of the address two, the data d3 of the address three and the data d4 of the address four are added by the adder 115, and the added two and half data VIDEOA2 are outputted from the adder 115 to the latch 116. Thereafter, the added two and half data VIDEOA2 are latched in the latch 116 at a timing represented by the timing signal ADDLA, and are outputted as the image data VIDEOA.

Thereafter, the above-mentioned addition operation is repeated every five clocks $\overline{DREQ}$ in a manner similar to that described above.

Figure 22:
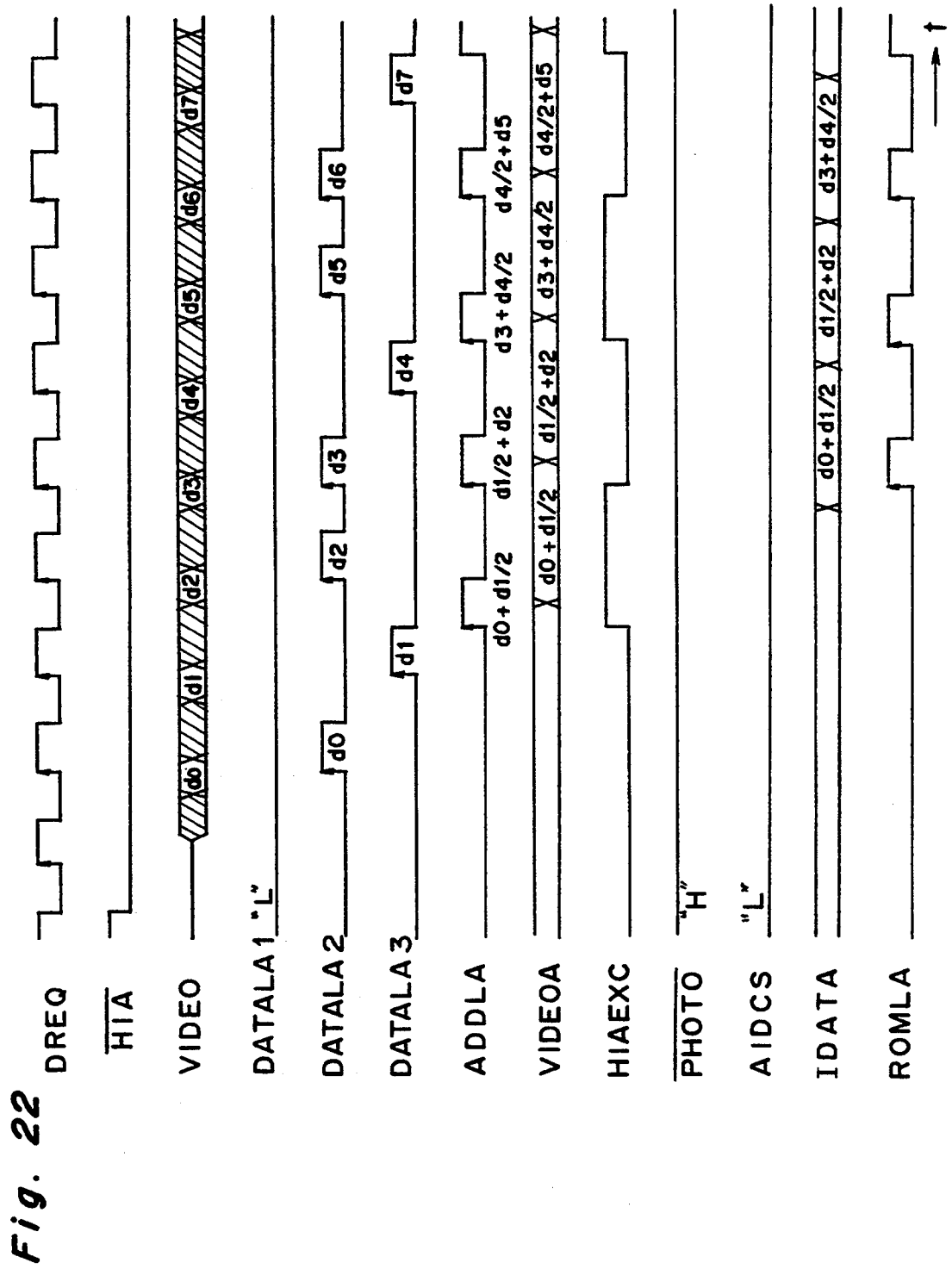
FIG. 22 is a timing chart showing an operation in a standard mode of the adder section shown in FIG. 20.

FIG. 22 is a timing chart showing the addition operation in the standard mode of the adder section 53.

In the standard mode, since the addition of one and half density data is performed, the latch 111 is not used and only the other latches 112 and 113 are used. Due to this, the timing signal DATALA1 supplied to the latch 111 is always kept the low level. On the other hand, the timing signal DATALA2 supplied to the latch 112 is generated so that the latch 112 can latch the 3m-th and (3m+2)-th data, wherein m is zero or a positive integer. The timing signal DATALA3 supplied to the latch 113 is generated so that the latch 113 can latch the (3m+1)-th data. Further, the timing signal ADDLA supplied to the latch 116 for latching the added one and half data is generated every one and half clocks $\overline{DREQ}$.

The first one period of the addition operation of the adder section 53 will be described below.

The data d0 of the address zero are latched in the latch 112 at a timing represented by the timing signal DATALA2, and then, the data d1 of the address one are latched in the latch 113 at a timing represented by the timing signal DATALA3. Then, the data d0 of the address zero and half the data d1 of the address one are added by the adder 115, and the added one and half data are outputted from the adder 115. Thereafter, the added one and half data are latched in the latch 116 at a timing represented by the timing signal DATALA, and the latched data are outputted as the density data VIDEOA. Thereafter, the data d2 of the address two are latched in the latch 112 at a timing represented by the timing signal DATALA2. Then, half the data d1 of the address one and the data d2 of the address two are added by the adder 115, and then, the added one and half data are outputted from the adder 115 to the latch 116. The added one and half data are latched in the latch 116 at a timing represented by the timing signal ADDLA, and are outputted as the density data VIDEOA.

Thereafter, the above-mentioned addition operation is repeated every three clocks $\overline{DREQ}$ in a manner similar to that described above.

(e) Correction of Density Data

The density data added by the adder section 53 are corrected by the correction section 54 with taking the $\gamma$ correction etc. into consideration, as described in the paragraph (a-2) (See FIGS. 7 and 13).

In the correction of the density data of the present preferred embodiment, predetermined suitable corrections are performed in the standard mode and the photograph mode, respectively, and further a predetermined suitable correction is performed in an automatic image density control (referred to as an AIDC) mode for controlling a toner amount upon developing so as to keep the maximum image density constant. It is to be noted that the AIDC mode is not described in this specification.

Figure 23:
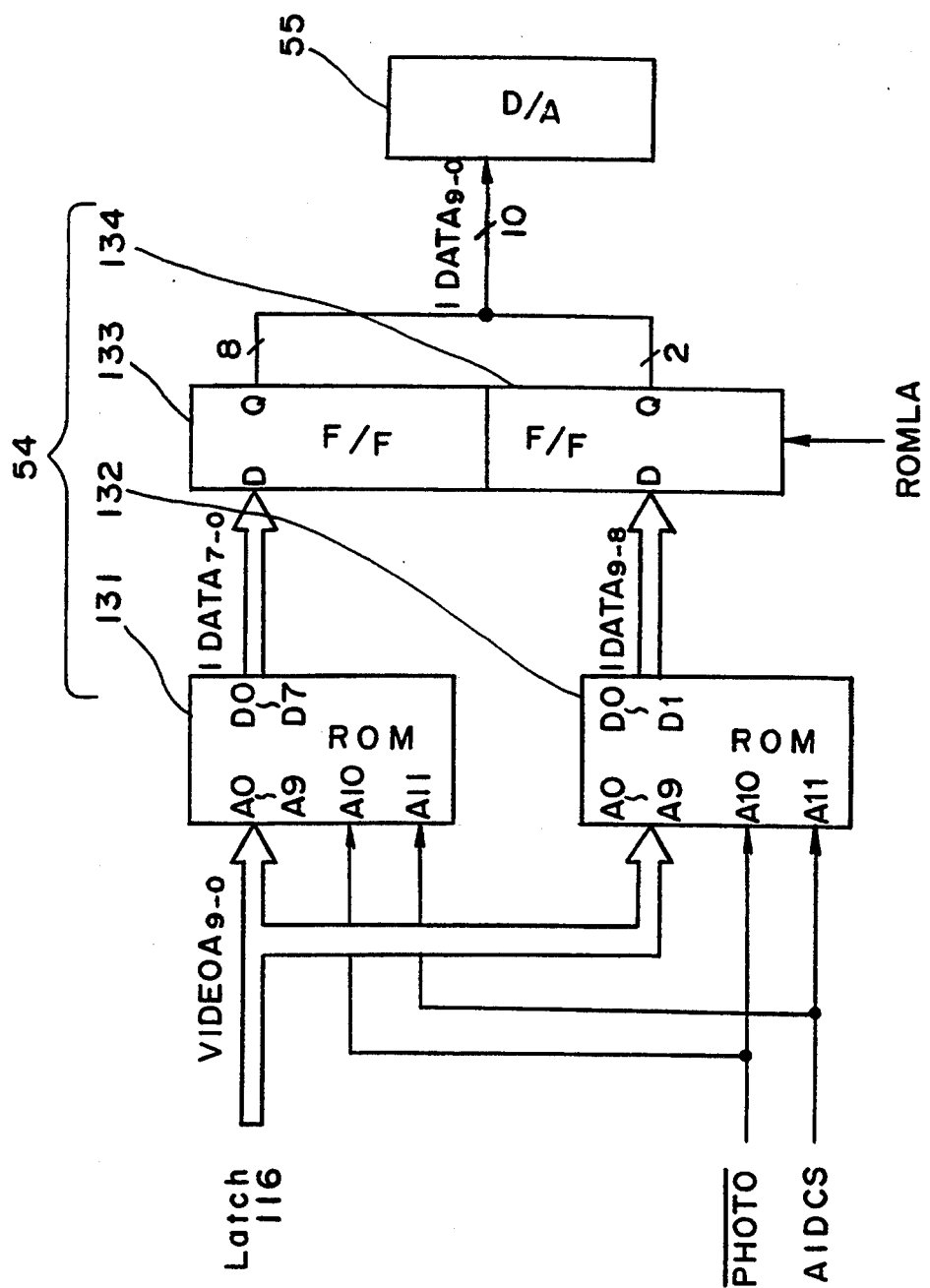
FIG. 23 is a schematic block diagram showing a composition of a correction section of the print head controller shown in FIG. 17.

FIG. 23 shows a composition of the correction section 54.

Figure 24:
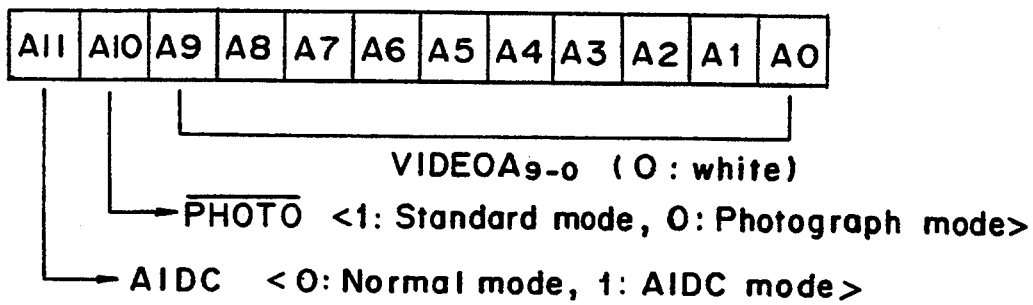
FIG. 24 is a schematic diagram showing addresses of ROMs of the correction section shown in FIG. 23.

Referring to FIG. 23, the density data VIDEOA of 10 bits outputted from the adder section 53 are inputted to less significant bits A0 to A9 of an address terminal of each of two ROMs 131 and 132. As shown in FIG. 24, the photograph mode signal $\overline{PHOTO}$ is inputted to the tenth bit A10 of the address terminal of each of the ROMs 131 and 132 in order to select one of the photograph mode and the standard mode, and an AIDC mode signal AIDCS for representing whether or not either the AIDC mode is selected is inputted to the most significant bit A11 of the address terminal of each of the ROMs 131 and 132.

Figure 25:
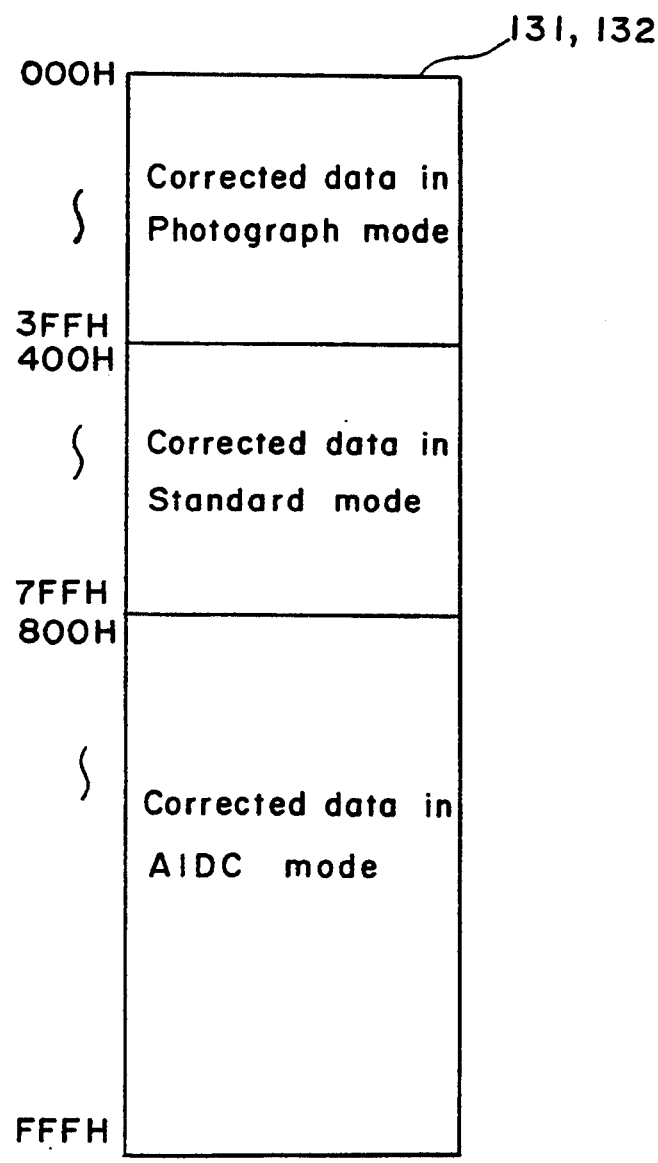
FIG. 25 is a memory map of the ROMs of the correction section shown in FIG. 23.

FIG. 25 shows a memory map of the ROMs 131 and 132.

The corrected data in the photograph mode are stored at the addresses 000H to 3FFH of the ROMs 131 and 132, the corrected data in the standard mode are stored at the addresses 400H to 7FFH thereof, and the corrected data in the AIDC mode are stored in the addresses 800H to FFFH thereof.

The data IDATA outputted from the bits D0 to D7 of the data terminal of the ROM 131 are latched in a delay type flip flop 133 at a timing represented by the timing signal ROMLA and the data IDATA outputted from the bits D0 to D1 of the data terminal of the ROM 132 are latched in a delay type flip flop 134 at a timing represented by the timing signal ROMLA. The data IDATA of 8 bits outputted from the flip flop 133 and the data IDATA of 2 bits outputted from the flip flop 134 are outputted to the D/A converter 55.

It is to be noted that the timing signal ROMLA is generated every time the data IDATA are outputted from the ROMs 131 and 132. The output timing of the data IDATA is shown in FIGS. 21 and 22.

(f) Switching of Gain in Subscan Direction

In the present preferred embodiment, the gain upon amplifying the density data is switched every one line in the subscan direction in order to obtain a faithful gradation up to a high gradation.

FIG. 26a schematically shows three printed dots on three lines L1, L2 and L3 in a low density, FIG. 26b schematically shows three printed dots on three lines L1, L2 and L3 in a middle density, and FIG. 26c schematically shows three printed dots on three lines L1, L2 and L3 in a high density.

The gain upon printing a dot on the second line L2 is set at a value smaller than the gains upon printing dots on the first and third lines L1 and L3 so that the dot printed on the second line L2 is not overlapped on the dots printed on the first and third lines L1 and L3 even in the high density. Due to this, as shown in a curve L of FIG. 27, a faithful gradation characteristic can be obtained up to the high density. On the other hand, if the gains upon printing dots on the three lines L1, L2 and L3 are set at substantially the same value as well as the conventional example, the dot printed on the second line L2 is overlapped on the dots printed on the first and third lines L1 and L3 in the high density, and a variation in the gradation becomes small in the high density. Then, the gradation of an image can not reproduced upon printing the image (for example, See a curve M of FIG. 27).

FIG. 28 is a circuit diagram showing a composition of the gain switching section 56.

Referring to FIG. 28, the analogue voltage DOUT outputted from the D/A converter 55 is inputted to an non-inverted input terminal of an operational amplifier 151 for operating as a voltage follower, and then, an analogue voltage Vi outputted from the operational amplifier 151 is inputted to an inverted input terminal of an operational amplifier 152 of a differential amplifier AMP1 through an input resistor R1, and also is inputted to an inverted input terminal of an operational amplifier 153 of a differential amplifier AMP2 through an input resistor R11. It is to be noted that the analogue voltage Vi outputted from the operational amplifier 151 is fed back to an inverted input terminal thereof.

The differential amplifier AMP1 comprises the operational amplifier 152, the input resistor R1, a feed back resistor R2 which is connected between the inverted input terminal of the operational amplifier 152 and the output terminal thereof, and resistors R3 to R5 for generating a predetermined reference voltage $V_{R1}$. A non-inverted input terminal of the operational amplifier 152 is connected to a direct-current voltage source Vcc through the resistors R3 and R4 and is connected to ground through the resistors R3 and R5. The amplified voltage $V_{o1}$ is outputted from the operational amplifier 152 to a terminal a of an analogue switch 154.

The differential amplifier AMP2 comprises the operational amplifier 153, the input resistor R11, a feed back resistor R12 which is connected between the inverted input terminal of the operational amplifier 153 and the output terminal thereof, and resistors R13 to R15 for generating a predetermined reference voltage $V_{R2}$. A non-inverted input terminal of the operational amplifier 153 is connected to a direct-current voltage source Vcc through the resistors R13 and R14 and is connected to ground through the resistors R13 and R15. The amplified voltage $V_{o2}$ is outputted from the operational amplifier 153 to a terminal b of an analogue switch 154.

In the present preferred embodiment, the differential amplifiers AMP1 and AMP2 have different gains of, for example, 10% and 80%, respectively. The analogue switch 154 is switched every one line according to the signal HIAEXC so that the output voltages $V_{o1}$ and $V_{o2}$ outputted from the differential amplifiers AMP1 and AMP2 are selectively outputted as the analogue signal AMP, alternately.

The output voltages $V_{o1}$ and $V_{o2}$ are represented by the following equations (1) and (2).

$$V_{o1} = -\frac{R_2}{R_1} V_i + \left(1 + \frac{R_2}{R_1}\right) \cdot \left(\frac{R_5}{R_4 + R_5}\right) \cdot V_{cc} \quad (1)$$

$$V_{o2} = -\frac{R_{12}}{R_{11}} V_i + \left(1 + \frac{R_{12}}{R_{11}}\right) \cdot \left(\frac{R_{15}}{R_{14} + R_{15}}\right) \cdot V_{cc} \quad (2)$$

Therefore, respective gains of the differential amplifiers AMP1 and AMP2 can be adjusted by changing the resistances of the resistors R1 and R2 and the resistances of the resistors R11 and R12.

It is noted that the signal HIAEXC for switching the analogue switch 154 is generated by switching an output voltage generated by a monostable multi-vibrator according to the timing signal ADDLA (See FIGS. 21 and 22).

(g) Integrating Circuit and Comparator Section

Figure 29:
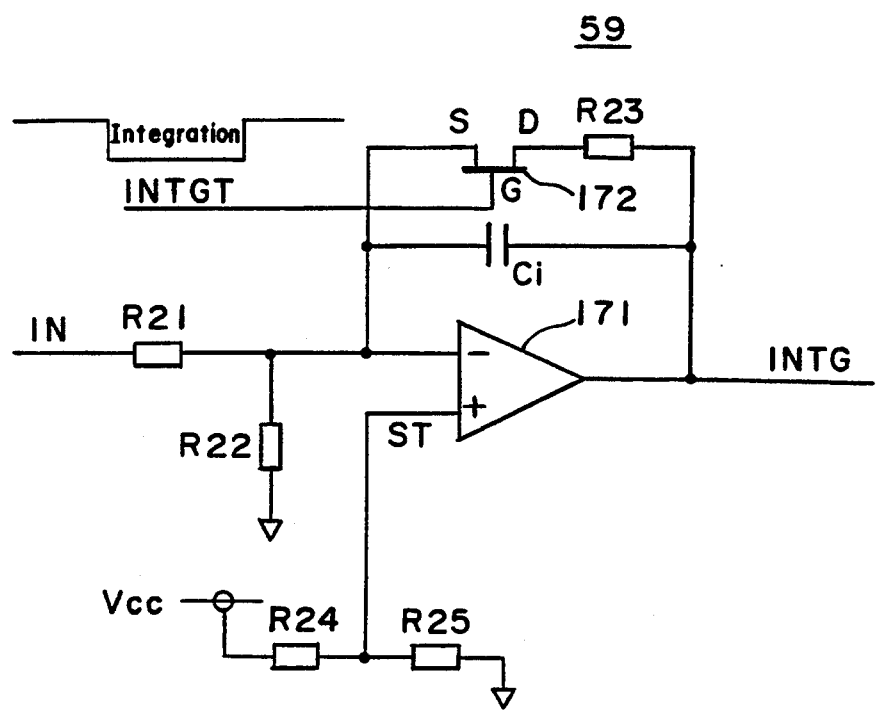
FIG. 29 is a circuit diagram showing a composition of an integrating circuit shown in FIG. 17.

FIG. 29 is a circuit diagram showing a composition of the integrating circuit 59.

Referring to FIG. 29, the analogue voltage IN whose offset is adjusted by the gain and offset adjustment section 58 is integrated using an operational amplifier 171. In the integrating circuit 59, the analogue voltage IN is inputted through a resistor R21 to an inverted input terminal of the operational amplifier 171 which is connected to ground through a resistor R22. A capacitor Ci for the integration is connected between the inverted input terminal of the operational amplifier 171 and the output terminal thereof, and further, the non-inverted input terminal of the operational amplifier 171 is connected to the output terminal thereof through a source and a drain of an FET 172 for switching and a resistor R23. On the other hand, a non-inverted input terminal of the operational amplifier 171 is connected to a direct-current voltage source Vcc through a resistor R24 and is connected to ground through a resistor R25. Then, a reference voltage ST induced across the resistor R25 is applied to the non-inverted input terminal of the operational amplifier 171. The integral voltage INTG is outputted from the output terminal of the operational amplifier 171. The timing signal INTGT is inputted to a gate of the FET 172.

In the integrating circuit 59 constituted as described above, when the signal INTGT becomes the high level or the integrating circuit 59 is reset, the FET 172 is turned on, and then, a charge stored in the capacitor Ci is discharged. Thereafter, for the integration period, the signal INTGT becomes the low level, and the FET 172 is turned off. Then, the integration operation is performed.

The output voltage INTG outputted from the integrating circuit 59 is represented by the following equation (3).

$$INTG = -\frac{R_{23}}{R_{21}} IN + \left(\frac{R_{23}}{R_{21}} + \frac{R_{23}}{R_{22}} + 1\right) \cdot ST + \frac{ST - IN}{R_1 \cdot C_i} t + \frac{ST}{R_2 \cdot C_i} t \quad (3)$$

where t is an integration time.

Figure 30:
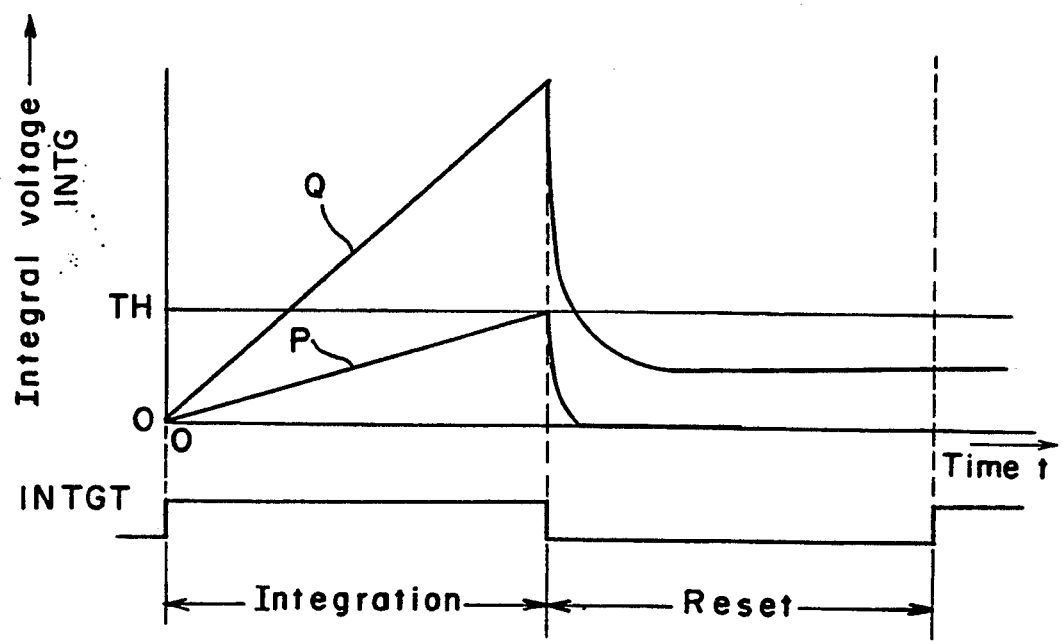
FIG. 30 is a timing chart of waveforms of the integral voltage INTG and the signal INTGT showing an operation of the integrating circuit shown in FIG. 29.

FIG. 30 shows a waveform P of the integral voltage INTG when the input voltage IN is equal to the reference voltage ST or in the case of the maximum density, and a waveform Q of the integral voltage INTG when the input voltage IN is higher than the reference voltage ST or in the case that the density is lower than the maximum density. In FIG. 30, TH is the threshold voltage of the comparator section 60.

When the integral voltage INTG is lower than the threshold voltage TH, the laser diode ON signal LDON having the high level is outputted. In the case of the maximum density, the integral voltage INTG becomes threshold voltage TH at the end of the integration period. If the density is equal to or lower than the maximum density, the integral voltage INTG having the waveform Q of FIG. 30 becomes higher than the threshold voltage TH until the end of the integration period.

In the case of regarding the gradation characteristic in a high density as important, there is used the waveform P of the integral voltage INTG in the case of a density of zero corresponding to the case that the input voltage IN is the minimum value (See FIG. 13).

In the case of the high speed two systems type light emitting controller shown in FIG. 18, the integrating circuit shown in FIG. 29 is used as the integrating circuits 59 and 73, and the comparator section is used as the comparator sections 60 and 74. The signal INTGT is generated so that the integration is performed in both the systems, alternately.

Figure 31:
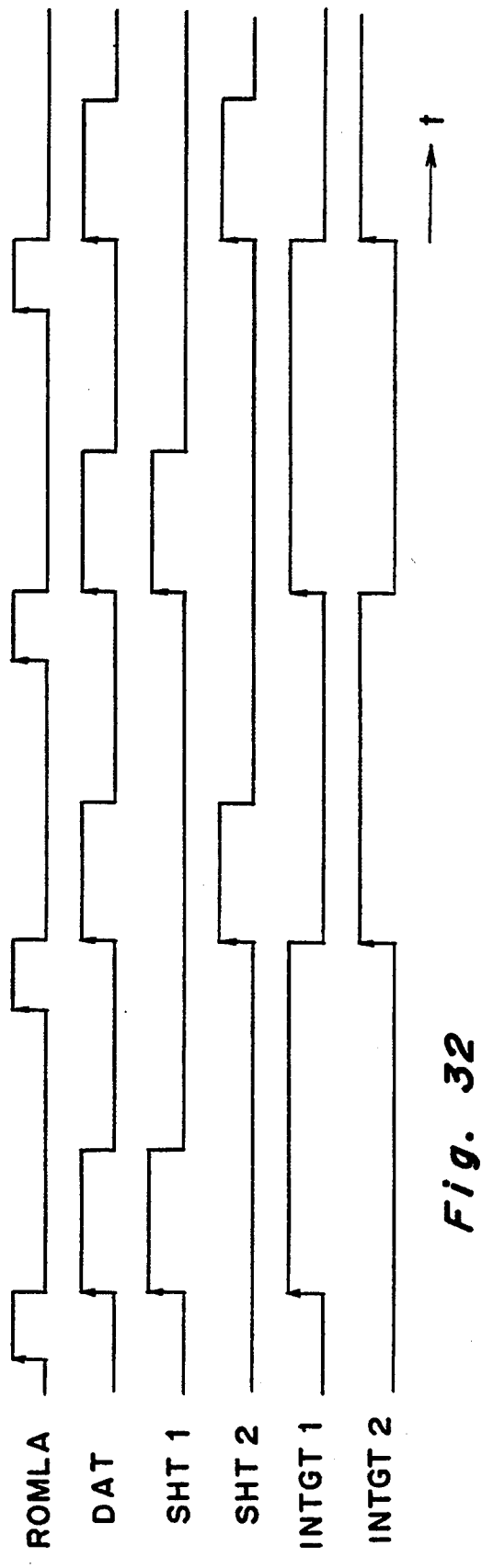
FIG. 31 is a timing chart showing an operation in the photograph mode of the integrating circuit shown in FIG. 29.
Figure 32:
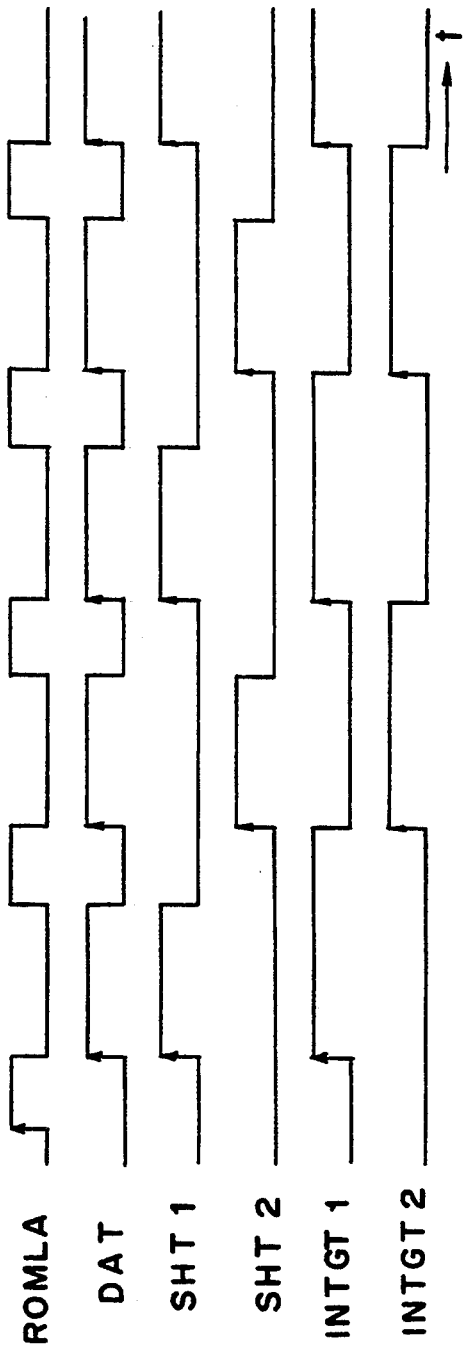
FIG. 32 is a timing chart showing an operation in the standard mode of the integrating circuit shown in FIG. 29.

FIG. 31 is a timing chart showing the integration operation in the photograph mode of the integrating circuits 59 and 73, and FIG. 32 is a timing chart showing the integration operation in the standard mode thereof. In the integrating circuit 59 and 73, the integration and the reset are alternately performed, respectively, according to the signals INTGT1 and INTGT2.

Figure 33:
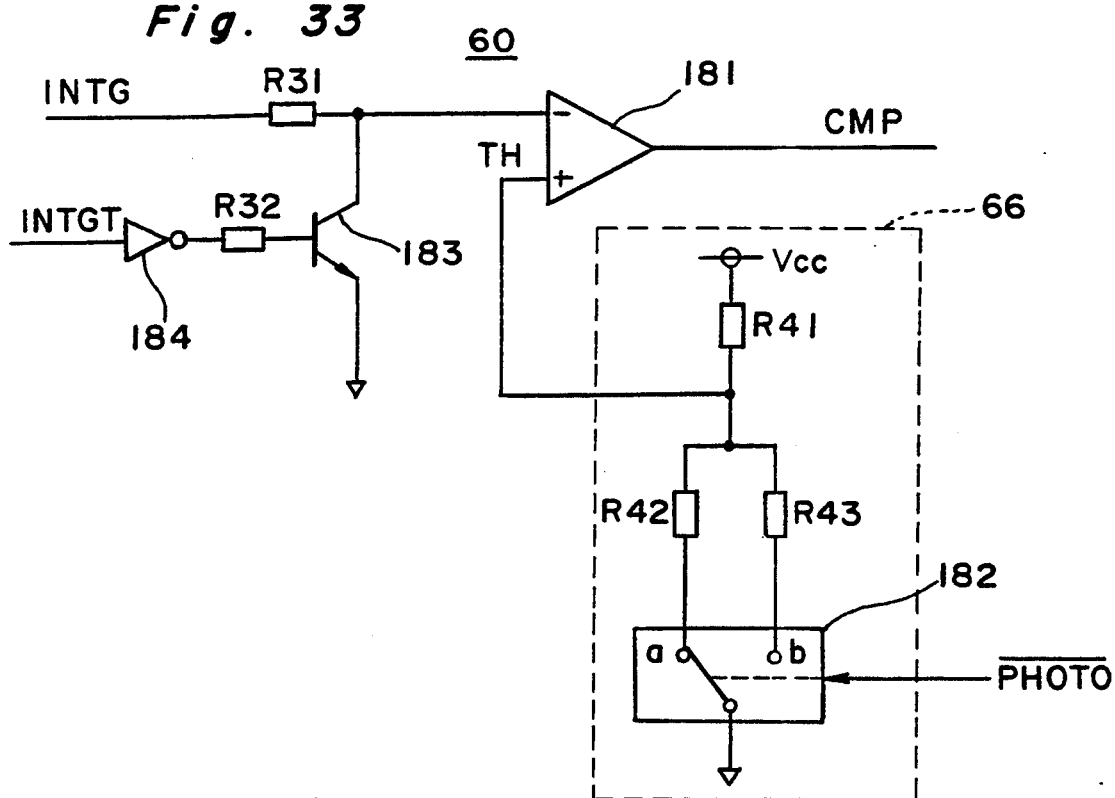
FIG. 33 is a schematic block diagram showing a composition of a comparator section shown in FIG. 17.

FIG. 33 is a circuit diagram showing a composition of the comparator section 60.

Referring to FIG. 33, the integral voltage INTG outputted from the integrating circuit 59 is inputted to an inverted input terminal of a comparator 181 through a resistor R31. Further, the inverted input terminal of the comparator 181 is connected to a collector of an NPN type transistor 183 whose emitter is connected to ground. The signal INTGT is inputted to a base of the transistor 183 through an inverter 184 and a resistor R32. On the other hand, the threshold voltage TH outputted from the threshold voltage generator 66 is inputted to a non-inverted input terminal of the comparator 181.

The threshold voltage generator 66 comprises three resistors R41 to R43 and an analogue switch 182, wherein the resistor R42 is different from the resistor R43. The direct-current voltage source Vcc is connected to ground through the resistors R41 and R42 and a terminal a of the analogue switch 182, and is connected to ground through the resistor R41 and R43 and a terminal b of the analogue switch 182. The connection point between the resistors R41 and R42 or the resistors R41 and R43 is connected to the non-inverted input terminal of the comparator 181.

The threshold voltage TH is switched over into a value corresponding to the addition mode, namely the standard mode or the photograph mode according to the photograph node signal $\overline{PHOTO}$. Namely, when the photograph mode signal $\overline{PHOTO}$ becomes the low level, or the photograph mode is selected, the analogue switch 182 is switched over into the terminal a, the threshold voltage TH into which the voltage supplied from the direct-current voltage source Vcc is divided by the resistors R41 and R42 is applied to the non-inverted input terminal of the comparator 181. On the other hand, when the photograph mode signal $\overline{PHOTO}$ becomes the high level or the standard mode is selected, the threshold voltage TH into which the voltage supplied from the direct-current voltage source Vcc is divided by the resistors R41 and R43 is applied to the non-inverted input terminal of the comparator 181.

The comparator 181 compares the integral voltage INTG inputted to the inverted input terminal thereof with the threshold voltage TH inputted to the non-inverted input terminal thereof, and then, outputs a comparison signal CMP for generating a pulse width. For the reset period of the integrating circuit 59, the signal INTGT is inputted to the base of the transistor 183 through the inverter 184 and the resistor R32, and then, the transistor 183 is turned on. At that time, a compulsory reset can be performed in a high speed, and the voltage applied to the inverted input terminal of the comparator 181 becomes zero. Therefore, the density data are faithfully converted into the comparison signal CMP, and the comparison signal CMP is outputted therefrom.

In order to remove the influence of the reset of the integrating circuit 59, a signal processing can be easily performed if the voltage inputted to the inverted input terminal of the comparator 181 is dropped to zero level as shown in FIG. 33. However, as shown in FIG. 34, an output voltage CMPA outputted from the comparator 181 and the signal INTGT may be inputted to input terminals of an AND gate 185 which outputs the integral voltage INTG so that the integral voltage INTG can be canceled for the reset period.

In a method of setting the input voltage IN inputted to the integrating circuit 59 at a larger value in a low density, since the laser diode ON signal LDON having the high level is outputted until the integral voltage INTG becomes larger than the threshold voltage TH as shown in FIG. 2a, the laser diode ON signal LDON is certainly outputted even though the density data are small or the input voltage IN inputted to the integrating circuit 59 is low. In this case, for example, the semiconductor laser diode LD is slightly turned on in a background portion of an image, and there is a possibility of printing an unnecessary image.

Figure 35:
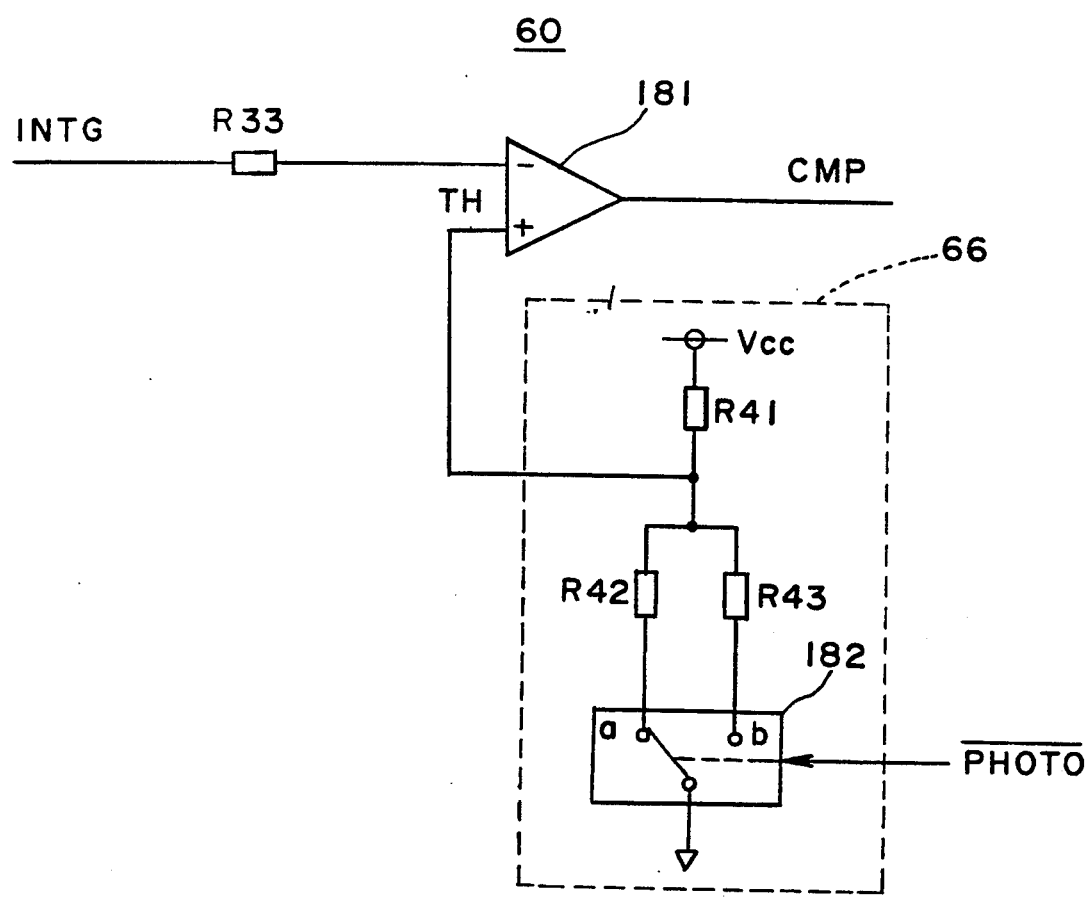
FIG. 35 is a schematic block diagram showing a composition of another modification of the comparator section shown in FIG. 33.

In order to solve the above problems, in the two systems type light emitting controller shown in FIG. 8, a comparator section shown in FIG. 35 is used as the comparator sections 60 and 74, and comparison signals CMP1 and CMP2 outputted from these comparator sections 60 and 74 are inputted to the laser diode driver 61 through an AND gate (not shown) not an OR gate.

In the comparator section shown in FIG. 35, the integral voltage INTG outputted from the integrating circuit is directly inputted to the inverted input terminal of the comparator 181 without passing through any transistor, and the threshold voltage TH outputted from the threshold voltage generator 66 is inputted to the non-inverted input terminal of the comparator 181. In this comparator section, even for the reset period of the integrating circuit, there is provided a period when the integral voltage INTG is smaller than the threshold voltage TH.

Figure 36:
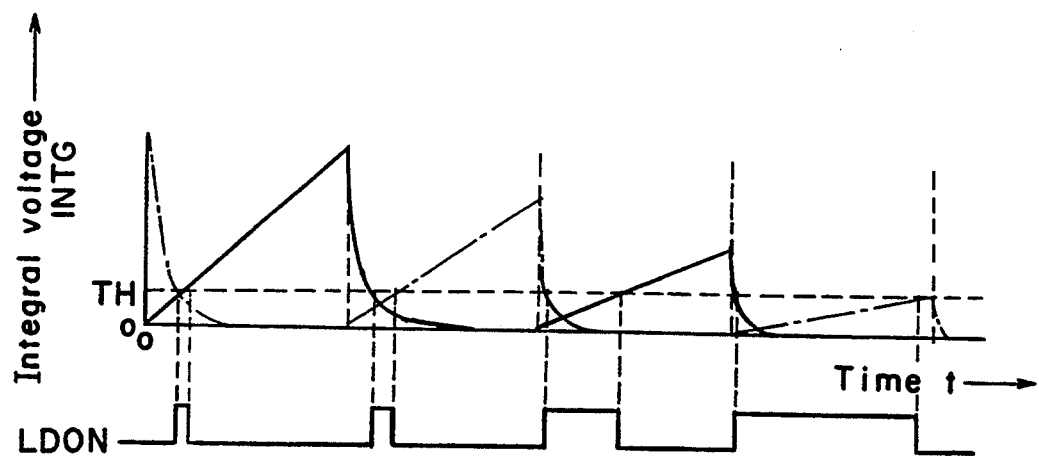
FIG. 36 is a timing chart of waveforms of the integral voltage INTG and the laser diode ON signal LDON showing an operation of high speed two systems type print head controller.

FIG. 36 shows a relationship between the integral voltage INTG and the laser diode ON signal LDON outputted from the above-mentioned AND gate.

As is apparent from FIG. 36, when the integral voltage INTG decreases to the threshold voltage TH for the reset period of the integration circuit of one system, the laser diode ON signal LDON is turned on, and then, the laser diode ON signal LDON is turned off when the integral voltage INTG becomes equal to or larger than the threshold voltage TH. In this case, even in the minimum density, there is a certain time from the beginning of the integration period to a timing when the integral voltage INTG becomes larger than the threshold voltage TH. However, the laser diode ON signal LDON does not become the high level until the reset integral voltage INTG outputted from the integrating circuit of another system becomes smaller than the threshold voltage TH.

As the density data becomes smaller, a time period taken until the reset integral voltage INTG becomes smaller than the threshold voltage TH becomes larger. Therefore, the above-mentioned problems such a problem that a necessary image is printed in a background portion of an image can be solved.

(h) Modification

Even in an apparatus using a method of controlling the pulse width of the printing signal by comparing the density data with a sawtooth type threshold voltage, two systems type comparator sections may be provided as well as the above-mentioned preferred embodiment, and the two systems type comparator sections are operated alternately. In this case, the aforementioned influence of the reset can be removed and the density data can be processed in a high speed.

Even in an apparatus using a method of controlling the pulse width of the printing signal by comparing the density data with a sawtooth type threshold voltage, a reset period may be provided and the above apparatus may be constituted so that a printing signal is not outputted for the reset period. In this case, a pulse for printing an image can be outputted faithfully according to the density data without receiving any influence of the reset integral voltage when the threshold voltage is reset.

The present invention can be applied to an apparatus using a method of comparing a reference wave such as a sawtooth wave, a triangular wave with the density data. In this case, added plural density data are used as density data.

In the present preferred embodiment, the density data are integrated by the integrating circuit and the integrated density data are compared with the predetermined threshold data by the comparator section. However, the present invention is not limited to this. The predetermined threshold data are integrated by the integrating circuit and the integrated threshold data are compared with the density data by the comparator section in a manner well known to those skilled in the art.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. An image forming apparatus for generating a printing signal having a pulse width according to image density data corresponding to an image to be formed and forming dot images on a paper each dot image having a size corresponding to said pulse width, comprising:

integrating means for integrating said image density data for a predetermined integration period and outputting integrated image density data;

comparing means for comparing said integrated image density data with a predetermined threshold data and generating the printing signal having a pulse width corresponding to said comparison result thereof;

timing signal generating means for generating a timing signal provided for integrating said image density data so that said predetermined integration period of said integrating means is different from a period corresponding to said image density data; and selection means for selecting any one of plural different integration periods of said integrating means, wherein said timing signal generating means generates said timing signal responsive to said integration period selected by said selection means.

2. The apparatus as claimed in claim 1, further comprising gain switching means for amplifying said image density data with different gains on alternate lines in a subscan direction which is perpendicular to a main scan direction in which said dot images are printed on a paper continuously so that printed dot images are not overlapped in said subscan direction and outputting said amplified image density data to said integrating means.

3. The apparatus as claimed in claim 2, further comprising correction means for correcting said image density data in a predetermined correction manner and outputting said corrected image density data to said gain switching means.

4. An image forming apparatus for generating a printing signal having a pulse width according to image density data corresponding to an image to be formed and forming dot images on a paper each dot image having a size corresponding to said pulse width, comprising:

integrating means for integrating said image density data for a predetermined integration period and outputting integrated image density data;

comparing means for comparing said integrated image density data with a predetermined threshold data and generating the printing signal having a pulse width corresponding to said comparison result thereof; and gain switching means for amplifying said image density data with different gains on alternate lines in a subscan direction which is perpendicular to a main scan direction in which said dot images are printed on a paper continuously so that printed dot images are not overlapped in said subscan direction and outputting said amplified image density data to said integrating means.

5. The apparatus as claimed in claim 4, further comprising correction means for correcting said image density data in a predetermined correction manner and outputting said corrected image density data to said gain switching means.

6. An image forming apparatus for generating a printing signal having a pulse width according to image density data corresponding to an image to be formed and forming dot images on a paper each dot image having a size corresponding to said pulse width, comprising:

integrating means for integrating said image density data for a predetermined integration period and outputting integrated image density data;

comparing means for comparing said integrated image density data with a predetermined threshold data and generating the printing signal having a pulse width corresponding to said comparison result thereof;

timing signal generating means for generating a timing signal provided for integrating said image density data so that said predetermined integration period of said integrating means is different from a period corresponding to said image density data; and gain switching means for amplifying said image density data with different gains on alternate lines in a subscan direction which is perpendicular to a main scan direction in which said dot images are not overlapped in said subscan direction and outputting said amplified image density data to said integrating means.

7. The apparatus as claimed in claim 6, further comprising correction means for correcting said image density data in a predetermined correction manner and outputting said corrected image density data to said gain switching means.

8. An image forming apparatus for generating a printing signal having a pulse width according to image density data corresponding to an image to be formed and forming dot images on a paper each dot image having a size corresponding to said pulse width, comprising:

integrating means for integrating said image density data for a predetermined integration period and outputting integrated image density data; and comparing means for comparing said integrated image density data with a predetermined threshold data and generating the printing signal having a pulse width corresponding to said comparison result thereof;

wherein said integrating means including plural integrating circuits, and said comparing means including plural comparators, and said apparatus further comprising control means for controlling said plural integrating circuits and said plural comparators so as to enable them alternately to sequentially generate said printing signal.

9. The apparatus as claimed in claim 8, further comprising gain switching means for amplifying said image density data with different gains on alternate lines in a subscan direction which is perpendicular to a main scan direction in which said dot images are printed on a paper continuously so that printed dot images are not overlapped in said subscan direction and outputting said amplified image density data to said integrating means.

10. The apparatus as claimed in claim 9, further comprising correction means for correcting said image density data in a predetermined correction manner and outputting said corrected image density data to said gain switching means.

11. An image forming apparatus for generating a printing signal having a pulse width according to image density data corresponding to an image to be formed and forming dot images on a paper each dot image having a size corresponding to said pulse width, comprising:

integrating means for integrating said image density data for a predetermined integration period and outputting integrated image density data;

comparing means for comparing said integrated image density data with a predetermined threshold data and generating the printing signal having a pulse width corresponding to said comparison result thereof; and adder means for adding image density data corresponding to each dot image to be printed and outputting said added image density data to said integrating means.

12. An image forming apparatus for generating a printing signal having a pulse width according to image density data corresponding to an image to be formed and forming dot images on a paper each dot image having a size corresponding to said pulse width, comprising:

integrating means for integrating said image density data for a predetermined integration period and outputting integrated image density data;

comparing means for comparing said integrated image density data with a predetermined threshold data and generating the printing signal having a pulse width corresponding to said comparison result thereof; and conversion means for complementarily converting said inputted image density data so that the greater said inputted data are, the smaller said converted data are and outputting said converted image density data to said integrating means.

13. An image forming apparatus for generating a printing signal having a pulse width responsive to density data of an image to be formed and predetermined reference data and forming said image responsive to said printing signal, comprising:

plural pulse generating means, each pulse generating means including integrating means for integrating one of said density data and said reference data for a predetermined integration period and outputting integrated data, and comparing means for comparing said integrated data with the other of said density data and said reference data and generating said printing signal having a pulse width corresponding to said comparison result thereof; and control means for controlling said plural pulse generating means to generate said printing signal every said integration period.

14. An image forming apparatus for integrating one of density data of an image to be formed and predetermined reference data for a predetermined integration period, comparing said integrated data with the other of said density data and said predetermined reference data, generating a printing signal having a pulse width corresponding to said comparison result thereof and forming an image responsive to said printing signal, comprising plural integrating means for integrating one of said density data and said predetermined reference data for said integration period; and switching means for sequentially selecting one of said plural integrating means to be used every integration period in a predetermined manner.

15. An image forming apparatus for generating a printing signal having a pulse width responsive to density data of an image to be printed and predetermined reference data and forming said image responsive to said printing signal, comprising:

integrating means for integrating one of said density data and said reference data for a predetermined integration period;

comparing means for comparing said integrated data with the other of said density data and said reference data and generating said printing signal having a pulse width corresponding to said comparison result thereof; and means for controlling said comparing means to inhibit from generating said printing signal for a period other than said integration period.

16. An image forming apparatus for generating a printing signal having a pulse width responsive to image data and forming each dot image corresponding to said pulse width so as to form an image of said image data on a paper, comprising:

conversion means for converting said density data into converted data so that the greater said inputted data are, the smaller said converted data are;

integrating means for integrating said converted data outputted from said conversion means for a predetermined integration period; and comparing means for comparing said integrated data outputted from said integrating means with a predetermined data and generating said printing signal having a pulse width corresponding to said comparison result thereof.

17. An image forming apparatus for generating a printing signal having a pulse width according to image density data corresponding to an image to be formed and forming dot images on a paper, each dot image having a size corresponding to said pulse width, said image density data being digital data, comprising:

converting means for converting said image density data into analog data;

an integrator for integrating said analog data converted by said converting means for a predetermined integration period, and for outputting integrated image density data;

comparing means for comparing said integrated image density data with a predetermined threshold data and for generating the printing signal having a pulse width corresponding to said comparison result thereof;

timing signal generating means for generating a timing signal provided for integrating said analog data so that said predetermined integration period of said integrator is different from a period corresponding to said image density data; and selection means for selecting any one of plural different integration periods of said integrator, wherein said timing signal generating means generates said timing signal responsive to said integration period selected by said selection means.

18. The apparatus as claimed in claim 17, further comprising gain switching means for amplifying said analog data with different gains on alternate lines in a subscan direction which is perpendicular to a main scan direction in which said dot images are printed on a paper continuously so that printed dot images are not overlapped in said subscan direction and outputting said amplified analog data to said integrator.

19. The apparatus as claimed in claim 18, further comprising correction means for correcting said image density data in a predetermined correction manner and outputting said corrected image density data to said converting means.

20. An image forming apparatus for generating a printing signal having a pulse width according to image density data corresponding to an image to be formed and forming dot images on paper, each dot image having a size corresponding to said pulse width, said image density data being digital data, comprising:

converting means for converting said image density data into analog data;

an integrator for integrating said analog data converted by said converting means for a predetermined integration period, and for outputting integrated image density data;

comparing means for comparing said integrated image density data with a predetermined threshold data and for generating the printing signal having a pulse width corresponding to said comparison result thereof; and gain switching means for amplifying said analog data with different gains on alternate lines in a subscan direction which is perpendicular to a main scan direction in which said dot images are printed on a paper continuously so that printed dot images are not overlapped in said subscan direction and outputting said amplified analog data to said integrator.

21. The apparatus as claimed in claim 20, further comprising correction means for correcting said image density data in a predetermined correction manner and outputting said corrected image density data to said converting means.

22. An image forming apparatus for generating a printing signal having a pulse width according to image density data corresponding to an image to be formed and forming dot images on a paper, each dot image having a size corresponding to said pulse width, said image density data being digital data, comprising:

converting means for converting said image density data into analog data;

an integrator for integrating said analog data converted by said converting means for a predetermined integration period, and for outputting integrated image density data;

comparing means for comparing said integrated image density data with a predetermined threshold data and for generating the printing signal having a pulse width corresponding to said comparison result thereof;

timing signal generating means for generating a timing signal provided for integrating said analog data so that said predetermined integration period of said integrator is different from a period corresponding to said image density data; and gain switching means for amplifying said analog data with different gains on alternate lines in a subscan direction which is perpendicular to a main scan direction in which said dot images are printed on a paper continuously so that printed dot images are not overlapped in said subscan direction and outputting said amplified analog data to said integrator.

23. The apparatus as claimed in claim 22, further comprising correction means for correcting said image density data in a predetermined correction manner and outputting said corrected image density data to said converting means.

24. An image forming apparatus for generating a printing signal having a pulse width according to image density data corresponding to an image to be formed and forming dot images on a paper, each dot image having a size corresponding to said pulse width, said image density data being digital data, comprising:
converting means for converting said image density data into analog data;
an integrator for integrating said analog data converted by said converting means for a predetermined integration period, and for outputting integrated image density data; and
comparing means for comparing said integrated image density data with a predetermined threshold data and for generating the printing signal having a pulse width corresponding to said comparison result thereof;
wherein said integrator includes plural integrating circuits, said comparing means includes plural comparators, and said apparatus further comprises control means for controlling said plural integrating circuits and said plural comparators so as to enable them to alternately, sequentially generate said printing signal.

25. The apparatus as claimed in claim 24, further comprising gain switching means for amplifying said analog data with different gains on alternate lines in a subscan direction which is perpendicular to a main scan direction in which said dot images are printed on a paper continuously so that printed dot images are not overlapped in said subscan direction and outputting said amplified analog data to said integrator.

26. The apparatus as claimed in claim 25, further comprising correction means for correcting said image density data in a predetermined correction manner and outputting said corrected image density data to said converting means.

27. An image forming apparatus for generating a printing signal having a pulse width according to image density data corresponding to an image to be formed and forming dot images on a paper, each dot image having a size corresponding to said pulse width, said image density data being digital data, comprising:
converting means for converting said image density data into analog data;
an integrator for integrating said analog data converted by said converting means for a predetermined integration period, and for outputting integrated image density data;
comparing means for comparing said integrated image density data with a predetermined threshold data and for generating the printing signal having a pulse width corresponding to said comparison result thereof; and
adder means for adding image density data corresponding to each dot image to be printed and outputting said added image density data to said converting means.

28. An image forming apparatus for generating a printing signal having a pulse width according to image density data corresponding to an image to be formed and forming dot images on a paper, each dot image having a size corresponding to said pulse width, said image density data being digital data, comprising:
converting means for converting said image density data into analog data;
an integrator for integrating said analog data converted by said converting means for a predetermined integration period, and for outputting integrated image density data;
comparing means for comparing said integrated image density data with a predetermined threshold data and for generating the printing signal having a pulse width corresponding to said comparison result thereof; and
further conversion means for complementarily converting said inputted image density data so that the greater said inputted image density data are, the smaller said converted data are and outputting said converted image density data to said converting means.

* * * * *